United States Patent
Wang et al.

(10) Patent No.: US 11,128,425 B2
(45) Date of Patent: Sep. 21, 2021

(54) METHODS AND NODES IN A WIRELESS COMMUNICATION NETWORK

(71) Applicant: HUAWEI TECHNOLOGIES CO., LTD., Guangdong (CN)

(72) Inventors: Fan Wang, Shanghai (CN); Fredrik Berggren, Kista (SE); Anahid Robert Safavi, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 15/971,199

(22) Filed: May 4, 2018

(65) Prior Publication Data
US 2018/0254874 A1 Sep. 6, 2018

Related U.S. Application Data

(63) Continuation of application No. PCT/EP2015/075974, filed on Nov. 6, 2015.

(51) Int. Cl.
*H04L 5/00* (2006.01)
*H04B 7/06* (2006.01)
*H04W 72/04* (2009.01)

(52) U.S. Cl.
CPC ......... *H04L 5/0053* (2013.01); *H04B 7/0626* (2013.01); *H04L 5/0091* (2013.01); *H04L 5/0092* (2013.01); *H04W 72/042* (2013.01)

(58) Field of Classification Search
CPC ... H04B 7/0626; H04L 5/0053; H04L 5/0091; H04L 5/0092; H04W 72/042
See application file for complete search history.

(56) References Cited

U.S. PATENT DOCUMENTS

| | | | |
|---|---|---|---|
| 10,039,088 B2 * | 7/2018 | Papasakellariou | H04W 72/042 |
| 2010/0118810 A1 | 5/2010 | Qu et al. | |
| 2011/0243066 A1 * | 10/2011 | Nayeb Nazar | H04L 5/0055 370/328 |
| 2012/0078933 A1 * | 3/2012 | Kim | H04L 5/0007 707/758 |
| 2012/0236818 A1 | 9/2012 | Kaminski et al. | |
| 2012/0269140 A1 | 10/2012 | Nam et al. | |

(Continued)

FOREIGN PATENT DOCUMENTS

| CN | 101282567 A | 10/2008 |
|---|---|---|
| CN | 102652402 A | 8/2012 |

(Continued)

OTHER PUBLICATIONS

MediaTek Inc., "Design Considerations on LAA design," 3GPP TSG RAN WG1 Meeting #80 (R1-150575), Athens, Greece, Feb. 9-13, 2015, 6 pages.

(Continued)

*Primary Examiner* — Khaled M Kassim
(74) *Attorney, Agent, or Firm* — Gregg L. Jansen

(57) ABSTRACT

Example transmit devices, receive devices, and related methods are described herein, In one example, transmission burst information is provided to a receive device by downlink control signalling. An example transmit device is configured to transmit a Downlink Control Information, or DCI, the DCI including the transmission burst information. The DCI has the same number of bits as a DCI format used for PDSCH scheduling.

18 Claims, 7 Drawing Sheets

(56) References Cited

U.S. PATENT DOCUMENTS

| | | | |
|---|---|---|---|
| 2012/0320840 A1* | 12/2012 | Kim | H04L 5/001 370/329 |
| 2013/0034073 A1* | 2/2013 | Aiba | H04L 1/0026 370/329 |
| 2013/0039302 A1* | 2/2013 | Miki | H04L 5/001 370/329 |
| 2013/0044706 A1* | 2/2013 | Suzuki | H04W 72/042 370/329 |
| 2013/0114570 A1 | 5/2013 | Park et al. | |
| 2013/0178220 A1* | 7/2013 | Lee | H04W 72/042 455/450 |
| 2013/0194995 A1* | 8/2013 | Reinhardt | H04W 52/0219 370/311 |
| 2013/0195041 A1* | 8/2013 | Papasakellariou | H04W 72/042 370/329 |
| 2013/0201964 A1* | 8/2013 | Kim | H04W 72/0453 370/335 |
| 2014/0105162 A1* | 4/2014 | Li | H04W 72/042 370/329 |
| 2014/0314007 A1* | 10/2014 | Chen | H04B 7/00 370/329 |
| 2015/0016408 A1* | 1/2015 | Yang | H04L 5/001 370/330 |
| 2015/0186784 A1* | 7/2015 | Barborak | G09B 7/04 706/11 |
| 2015/0215097 A1* | 7/2015 | Yi | H04W 52/48 370/329 |
| 2015/0215905 A1* | 7/2015 | Park | H04B 7/0473 370/329 |
| 2015/0215906 A1* | 7/2015 | Park | H04W 76/10 370/312 |
| 2015/0223208 A1* | 8/2015 | Park | H04L 5/001 370/329 |
| 2015/0289237 A1* | 10/2015 | Kim | H04L 5/0094 370/329 |
| 2016/0073366 A1* | 3/2016 | Ng | H04W 56/001 370/329 |
| 2016/0100422 A1* | 4/2016 | Papasakellariou | H04L 1/1896 370/329 |
| 2016/0227521 A1* | 8/2016 | Han | H04W 72/042 |
| 2016/0309542 A1* | 10/2016 | Kowalski | H04W 76/27 |
| 2016/0337110 A1* | 11/2016 | Yang | H04L 5/14 |
| 2017/0006626 A1* | 1/2017 | Lin | H04W 16/14 |
| 2017/0019915 A1* | 1/2017 | Nogami | H04L 5/0053 |
| 2017/0034808 A1* | 2/2017 | Ouchi | H04W 72/042 |
| 2017/0093620 A1* | 3/2017 | Um | H04L 41/0803 |
| 2017/0094642 A1* | 3/2017 | Lee | H04L 5/0055 |
| 2017/0118745 A1* | 4/2017 | Nogami | H04W 72/0406 |
| 2017/0118792 A1* | 4/2017 | Rico Alvarino | H04W 76/28 |
| 2017/0135127 A1* | 5/2017 | Nogami | H04W 72/1289 |
| 2017/0202025 A1* | 7/2017 | Ouchi | H04W 76/28 |
| 2017/0347270 A1* | 11/2017 | Iouchi | H04W 72/0406 |
| 2018/0007688 A1 | 1/2018 | Fu et al. | |
| 2018/0110043 A1* | 4/2018 | Shi | H04W 72/0446 |
| 2018/0199369 A1* | 7/2018 | Larsson | H04W 74/0808 |
| 2018/0206129 A1* | 7/2018 | Choi | H04L 1/00 |
| 2018/0254874 A1 | 9/2018 | Wang et al. | |
| 2018/0287742 A1* | 10/2018 | Feng | H04L 1/1812 |
| 2018/0332566 A1* | 11/2018 | You | H04L 5/00 |
| 2018/0343645 A1* | 11/2018 | Papasakellariou | H04W 72/042 |
| 2019/0069312 A1* | 2/2019 | Oh | H04W 72/04 |

FOREIGN PATENT DOCUMENTS

| | | |
|---|---|---|
| CN | 102783207 A | 11/2012 |
| CN | 103069763 A | 4/2013 |
| CN | 105144621 A | 12/2015 |
| CN | 108352948 A | 7/2018 |
| EP | 3363136 B1 | 4/2021 |
| JP | 2015505436 A | 2/2015 |
| KR | 20140023400 A | 2/2014 |
| WO | 2011019009 A1 | 2/2011 |

OTHER PUBLICATIONS

Nokia Networks, "On DL transmission detection and UL subframe indication for LAA," 3GPP TSG RAN WG1 Meeting #82bis (R1-155602), Malmö, Sweden, Oct. 5-9, 2015, 6 pages.

Office Action issued in Japanese Application No. 2018-541488 dated Mar. 25, 2019, 8 pages (with English translation).

Office Action issued in Chinese Application No. 201580084401.2 dated Oct. 28, 2019, 18 pages (With English Translation).

Huawei Technologies Co et al:"Proposed Text for the TR on Refinement of the Clean—slate Physical Layer Design(update of GP-140870)", 3GPP Draft, 3rd Generation Partnership Project(3GPP), Mobile Competence Centre; vol. TSG Geran, no.San Francisco, USA; Nov. 17, 2014-Nov. 21, 2014, Nov. 21, 2014, XP050925138, 18 pages.

LG Electronics:"Indication of DL/UL TX burst structure", 3GPP Draft; R1-152737 TX Burst Indication Final, 3rd Generation Partnership Project (3GPP), Mobile Competence Centre; vol. RAN WG1, no .Fukuoka, Japan; May 25, 2015-May 29, 2015, May 24, 2015, XP050972808, 4 pages.

"Proposed text for the TR", 3GPP Draft;PCR TR 45820 V101 NB M2M—New Structure—C Lean—V5, 3rd Generation Partnership Project (3GPP), Mobile Competence Centre; Apr. 23, 2015, XP050945415, 24 pages.

"3GPP TS 36.212 V12.6.0 (Sep. 2015) 3rd Generation Partnership Project;Technical Specification Group Radio Access Network;Evolved Universal Terrestrial Radio Access (E-UTRA);Multiplexing and channel coding(Release 12), Technical Specification, 95 pages".

"3GPP TS 36.213 V12.7.0 (Sep. 2015) 3rd Generation Partnership Project;Technical Specification Group Radio Access Network;Evolved Universal Terrestrial Radio Access (E-UTRA);Physical layer procedures(Release 12), Technical Specification, 241 pages".

Huawei, HiSilicon, Downlink signaling for LAA transmission burst related information. 3GPP TSG RAN WG1 Meeting #83 Anaheim, CA, USA, Nov. 15-22, 2015, R1-156904, 10 pages.

International Search report and Written Opinion issued in International Application No. PCT/EP2015/075974 dated Jul. 7, 2016, 12 pages.

Non-Final Office Action issued in U.S. Appl. No. 16/182,711 dated Apr. 4, 2019, 32 pages.

Office Action issued in Korean Application No. 10-2018-7015061 dated Dec. 5, 2019, 9 pages (with English translation).

R1-154663—MediaTek Inc., "LAA DL transmissions," 3GPP TSG RAN WG1 #82, Beijing, China, Aug. 24-28, 2015, 7 pages.

MediaTek Inc.,"LAA control channel design",3GPP TSG RAN WG1 meeting #82-Bis R1-156059, Malmo, Sweden, Oct. 5-9, 2015, 2 pages.

Office Action issued in Chinese Application No. 201811179099.0, dated Jun. 17, 2019, 17 pages (With English translation).

* cited by examiner 220-1 DCI format for PDSCH scheduling 220-2 DCI format for transm. burst inform.

☐ An indication for the DCI used for the transmission burst information

▒ The LAA transmission burst information

☐ Remaining bits set to 0

METHODS AND NODES IN A WIRELESS COMMUNICATION NETWORK

CROSS-REFERENCE TO RELATED APPLICATIONS

This application is a continuation of International Application No. PCT/EP2015/075974, filed on Nov. 6, 2015, the disclosure of which is hereby incorporated by reference in its entirety.

TECHNICAL FIELD

Implementations described herein generally relate to a transmit device, a method in the transmit device, a receive device and a method therein. In particular is herein described a mechanism for providing transmission burst information to the receive device by downlink control signalling.

BACKGROUND

In the 3rd Generation Partnership Project (3GPP) Long Term Evolution (LTE) Release 13, Licensed Assisted Access (LAA), the transmission follows a Listen-Before-Talk (LBT) procedure and is based on a transmission burst.

LAA is sometimes also referred to as Licensed-Assisted Carrier Aggregation and concerns aggregation of a carrier wherein a primary cell is using a licensed spectrum to deliver critical information and guaranteed Quality of Service, and an unlicensed spectrum, such as e.g. a spectrum shared with WiFi, to opportunistically boost the transmitted data rate.

A transmission burst is on the Downlink (DL) and Uplink (UL) defined as follows: Each DL transmission burst is a continuous transmission from a DL transmitting node with no transmission immediately before or after from the same node on the same Component Carrier (CC). Each UL transmission burst from a User Equipment (UE) perspective is a continuous transmission from a UE with no transmission immediately before or after from the same UE on the same CC.

Unlike transmission in the licensed spectrum and due to the LBT procedure in conjunction with a maximum channel occupancy time, such as e.g. 4 ms., it is not certain that the transmission can occupy the whole last subframe. Hence, the end subframe may have a shorter duration than a regular subframe. For the downlink transmission burst, it is assumed that, concerning end subframe type and configuration, that DL transport block in the last subframe of a DL transmission burst can be transmitted using a Downlink Pilot Time Slot (DwPTS) structure, or a full subframe.

The reference signals Cell-specific Reference Signal (CRS)/Channel-State Information Reference Signal (CSI-RS) are transmitted in the DL Discovery Reference Signal (DRS), where they are used for Radio Resource Management (RRM) measurements. The DRS is also subject to LBT and can be transmitted within the Discovery signal Measurement Timing Configuration (DMTC). The CRS/CSI-RS can also be transmitted in the DL transmission burst, where they are used for channel estimation, for CSI measurements and for synchronisation. For the DL transmission burst, several agreements and working assumptions have been made, such as e.g. constant CRS/CSI-RS power in the DRS or dynamic CRS/CSI-RS power across transmission bursts. In the first case, the receive device/UE may assume that the transmission power for CRS and CSI-RS in the DRS is constant for RRM measurements regardless of the subframe in which the DRS is transmitted within the DMTC. In the latter case, the UE may assume that the CRS and CSI-RS transmission has a constant power in each subframe of the DL transmission burst, and the UE may not assume that the CRS and CSI-RS transmission power is the same across transmission bursts.

In addition, LAA may support some other information related to a transmission burst, such as e.g. 1/2 or 4/6 Orthogonal Frequency Division Multiplexing (OFDM) symbol CRS (dynamic Multicast/Broadcast over Single Frequency Network (MBSFN) configuration in a transmission burst); Number of expected DL subframes (starting from current subframe) in the ongoing transmission burst; Number of subframes after end of DL transmission during which UE need not monitor downlink control information and perform CSI measurements; Presence of CSI-RS/CSI-IM, etc.

At least some of the above information may be indicated to the UE for facilitating Physical Downlink Shared Channel (PDSCH) reception, Reference Signal Received Power (RSRP) measurement and/or CSI reporting. Methods are disclosed herein for providing the LAA UE with such information.

In a previously known conventional solution, the LAA transmit device/eNodeB transmits legacy Downlink Control Information (DCI) on a Physical Downlink Control Channel (PDCCH)/Enhanced PDCCH (EPDCCH), which is mainly for PDSCH scheduling purpose and does not indicate any of the LAA specific information such as the CRS/CSI-RS power, end subframe type and configuration.

The drawbacks of the legacy DCI based control information comprises that no information of the CRS/CSI-RS power is provided to the receiving device. This may cause wrong understanding of the CRS/CSI-RS power at the receiver side and further result in performance loss in terms of channel estimation and RSRP/CSI report accuracy, as channel averaging and filtering across different bursts may be derived from different CRS/CSI-RS powers. It may be noted that CRS/CSI-RS power may not be possible to derive by the receive device from blind detection. Further no information of the end subframe configuration is provided to the receive device. This causes uncertainty for the rate-matching in the receive device which may require the receive device to blindly detect the end subframe configuration, which increases the complexity of the receive device and potentially increases the block error rate.

SUMMARY

It is therefore an object to obviate at least some of the above mentioned disadvantages and to improve provision of burst related information to a receive device. This and other objects are achieved by the features of the appended independent claims. Further implementation forms are apparent from the dependent claims, the description and the figures.

According to a first aspect, a transmit device is provided, for providing transmission burst information to a receive device by downlink control signalling. The transmit device is configured to transmit a Downlink Control Information, DCI, comprising transmission burst information, wherein the DCI has the same number of bits as a DCI format used for PDSCH scheduling.

Thanks to the described aspect, transmission burst information related to a data transmission could be provided to the receive device, also for the receive device without PDSCH scheduled, in a LAA network environment. The receive device is capable to derive the transmission burst information.

In a first possible implementation of the transmit device according to the first aspect, the transmit device is further configured to set an indication that the DCI comprises transmission burst information, e.g. before transmission of the DCI.

Thereby the receive device is capable to derive the transmission burst information, thanks to the indication.

In a second possible implementation of the transmit device according to the first aspect, or the first possible implementation of the transmit device according to the first aspect, may be further configured to determine that a receive device is not scheduled on PDSCH and transmit the DCI comprising a format for transmission burst information; or determine that a receive device is scheduled on PDSCH and transmit the DCI comprising a format for PDSCH scheduling in addition to transmission burst information.

Thereby both transmission burst information and control information for PDSCH scheduling using one DCI may be provided to the receive device with PDSCH scheduled. Further, signalling overhead is kept low.

In a third possible implementation of the transmit device according to the first aspect, or any of the previously described possible implementations thereof, the DCI comprises the same number of bits, regardless if it comprises only the transmission burst information, or if it also comprises control information for PDSCH scheduling, i.e. said DCI formats comprise the same number of bits.

Thereby both transmission burst information and control information for PDSCH scheduling may be provided to the receive device with PDSCH scheduled, without increasing the number of blind decodes of the receive device. Further, signalling overhead is kept low.

In a fourth possible implementation of the transmit device according to the first aspect, or any of the previously described possible implementations thereof, the transmit device is further configured to determine that a receive device is scheduled on PDSCH and transmit a second DCI comprising a format for PDSCH scheduling.

Thereby, control information for PDSCH scheduling may be provided to the receive device with PDSCH scheduled, without modifying conventional DCI formats. Further, signalling overhead is kept low.

In a fifth possible implementation of the transmit device according to the first aspect, or any of the previously described possible implementations thereof, the indication specifying that the DCI comprises the transmission burst information comprises a flag indicating that DCI format 0 is used.

It then becomes possible for the receive device to distinguish DCI with different DCI formats from each other by reusing a flag that is not used in 3GPP LTE release 13, without introducing more signalling overhead.

In a sixth possible implementation of the transmit device according to the first aspect, or any of the previously described possible implementations thereof, the indication specifying that the DCI comprises the transmission burst information is comprised in a bit other than the flag indicating DCI format 0/1A is used.

It then becomes possible for the receive device to distinguish DCI with different DCI formats from each other, without increasing the number of blind decodes for the receive device. Further, forward compatibility to DCI format 0 used for uplink PUSCH scheduling is ensured.

In a seventh possible implementation of the transmit device according to the first aspect, or any of the previously described possible implementations thereof, the indication specifying that the DCI comprises the transmission burst information comprises a pre-defined code point.

Thereby, it then becomes possible for the receive device to distinguish DCI with different DCI formats from each other without introducing any additional bits. Another advantage is that forward compatibility to DCI format 0 used for uplink PUSCH scheduling is ensured.

In an eighth possible implementation of the transmit device according to the first aspect, or any of the previously described possible implementations thereof, the pre-defined code point is an invalid state derived from the resource assignment information in the DCI.

Thereby an efficient way by using an invalid state for resource assignment is used to distinguish DCI with different DCI formats from each other without introducing any additional bits.

In a ninth possible implementation of the transmit device according to the first aspect, or any of the previously described possible implementations thereof, the transmit device is further configured to jointly encode at least two of the three following pieces of the transmission burst information: whether or not the current subframe is the end subframe; the end subframe configuration; and/or the number of subframes to monitor.

By applying joint encoding, signalling overhead may be reduced, as the number of information bits by joint encoding is 4 bits, while 6 for separate encoding.

In a tenth possible implementation of the transmit device according to the first aspect, or any of the previously described possible implementations thereof, the transmit device is further configured to indicate the end subframe configuration by joint Radio Resource Control (RRC) configuration and physical layer signalling.

By applying joint encoding, signalling overhead may be reduced.

In an eleventh possible implementation of the transmit device according to the first aspect, or any of the previously described possible implementations thereof, the transmit device is further configured to indicate the CRS/CSI-RS signal power by providing a non-negative value as an offset to be added to a transmission power indicated by RRC signalling.

Thereby signalling overhead is reduced by not having any negative value.

In a twelfth possible implementation of the transmit device according to the first aspect, or any of the previously described possible implementations thereof, the transmission burst information comprises any of: end subframe configuration and/or power of a Cell-specific Reference Signal, CRS and/or Channel-State Information Reference Signal, CSI-RS.

Thereby, the transmit device may provide the receive device with essential information which may be used for e.g. PDSCH reception, RSRP measurement and/or CSI reporting.

In a thirteenth possible implementation of the transmit device according to the first aspect, or any of the previously described possible implementations thereof, the transmit device is further configured to determine a DCI format used for PDSCH scheduling.

Thereby further advantages are achieved.

According to a second aspect, a method is provided in a transmit device, for providing transmission burst information to a receive device by downlink control signalling. The method comprises transmitting a DCI comprising the transmission burst information, wherein the DCI has the same number of bits as the DCI format used for PDSCH scheduling.

Thanks to the described aspect, transmission burst information related to a data transmission could be provided to the receive device, also for the receive device without PDSCH scheduled, in a LAA network environment. Thus the receive device is capable to derive the transmission burst information.

In a first possible implementation of the method according to the second aspect, the method further comprises setting an indication that the DCI comprises transmission burst information, e.g. before transmission of the DCI.

Thus the receive device is capable to derive the transmission burst information from the indication.

In a second possible implementation of the method according to the second aspect, or the first possible implementation of the second aspect, the method further comprises determining that a receive device is not scheduled on PDSCH and transmit the DCI comprising a format for transmission burst information; and/or determining that a receive device is scheduled on PDSCH and transmit the DCI comprising a format for PDSCH scheduling in addition to transmission burst information.

Thereby both transmission burst information and control information for PDSCH scheduling using one DCI may be provided to the receive device with PDSCH scheduled. Further, signalling overhead is kept low.

In a third possible implementation of the method according to the second aspect, or any of the previously described possible implementations thereof, the DCI comprises the same number of bits, regardless if it comprises only the transmission burst information, or if it also comprises control information for PDSCH scheduling, i.e. the DCI formats comprises the same number of bits.

Thereby both transmission burst information and control information for PDSCH scheduling may be provided to the receive device with PDSCH scheduled, without increasing the number of blind decodes of the receive device. Further, signalling overhead is kept low.

In a fourth possible implementation of the method according to the second aspect, or any of the previously described possible implementations thereof, the method further comprises determining that a receive device is scheduled on PDSCH and transmit a second DCI comprising a format for PDSCH scheduling.

Thereby, control information for PDSCH scheduling may be provided to the receive device with PDSCH scheduled, without modifying conventional DCI formats. Further, signalling overhead is kept low.

In a fifth possible implementation of the method according to the second aspect, or any of the previously described possible implementations thereof, the indication specifying that the DCI comprises the transmission burst information comprises a flag indicating that DCI format 0 is used.

It then becomes possible for the receive device to distinguish DCI with different DCI formats from each other by reusing a flag that is not used in 3GPP LTE release 13, without introducing more signalling overhead.

In a sixth possible implementation of the method according to the second aspect, or any of the previously described possible implementations thereof, the indication specifying that the DCI comprises the transmission burst information is comprised in a bit other than the flag indicating DCI format 0/1A is used.

It then becomes possible for the receive device to distinguish DCI with different DCI formats from each other, without increasing the number of blind decoding s for the receive device. Further, forward compatibility to DCI format 0 used for uplink PUSCH scheduling is ensured.

In a seventh possible implementation of the method according to the second aspect, or any of the previously described possible implementations thereof, the indication specifying that the DCI 210-1, 210-2 comprises the transmission burst information comprises a pre-defined code point.

Thereby, it then becomes possible for the receive device to distinguish DCI with different DCI formats from each other without introducing any additional bits. Another advantage is that forward compatibility to DCI format 0 used for uplink PUSCH scheduling is ensured.

In an eighth possible implementation of the method according to the second aspect, or any of the previously described possible implementations thereof, the pre-defined code point is an invalid state derived from the resource assignment information in the DCI.

Thereby an efficient way by using an invalid state for resource assignment is used to distinguish DCI with different DCI formats from each other without introducing any additional bits.

In a ninth possible implementation of the method according to the second aspect, or any of the previously described possible implementations thereof, the method further comprises jointly encoding at least two of the three following pieces of the transmission burst information: whether or not the current subframe is the end subframe; the end subframe configuration; and/or the number of subframes to monitor.

By applying joint encoding, signalling overhead may be reduced, as the number of information bits by joint encoding is 4 bits, while 6 for separate encoding.

In a tenth possible implementation of the method according to the second aspect, or any of the previously described possible implementations thereof, the method further comprises indicating the end subframe configuration by joint RRC configuration and physical layer signalling.

By applying joint encoding, signalling overhead may be reduced.

In an eleventh possible implementation of the method according to the second aspect, or any of the previously described possible implementations thereof, the method further comprises indicating the CRS/CSI-RS signal power by providing a non-negative value as an offset to be added to a transmission power indicated by RRC signalling.

Thereby signalling overhead is reduced by not having any negative value.

In a twelfth possible implementation of the method according to the first aspect, or any of the previously described possible implementations thereof, the transmission burst information comprises any of: end subframe configuration and/or power of a CRS and/or CSI-RS.

Thereby, the transmit device may provide the receive device with essential information which may be used for e.g. PDSCH reception, RSRP measurement and/or CSI reporting.

In a thirteenth possible implementation of the method according to the first aspect, or any of the previously described possible implementations thereof, the method may also comprise determining a DCI format used for PDSCH scheduling.

Thereby, additional advantages are achieved.

According to a third aspect, a receive device is provided, for receiving transmission burst information by downlink control signalling from a transmit device. The receive device is configured to receive a DCI comprising the transmission burst information; wherein the DCI has the same number of bits a DCI format used for PDSCH scheduling. Further the receive device is configured to determine that the received DCI comprises transmission burst information. In addition, the receive device is configured to derive the transmission burst information from the DCI.

Thereby, thanks to the described aspect, transmission burst information related to a data transmission could be obtained from the transmit device, also for the receive device without PDSCH scheduled, in a LAA network environment. Thereby information is obtained, which may be used for e.g. PDSCH reception, RSRP measurement and/or CSI reporting.

In a first possible implementation of the receive device according to the third aspect, the receive device is further configured to determine that the received DCI comprises transmission burst information based on an indication in the DCI, specifying that the DCI comprises transmission burst information.

Thereby the receive device can distinguish between DCI comprising various types of information.

In a second possible implementation of the receive device according to the third aspect, or the first possible implementation of the third aspect, the receive device is further configured to receive a second DCI comprising a format for PDSCH scheduling, when the receive device is scheduled with PDSCH; derive control information for PDSCH scheduling from the second DCI and decode any information received on PDSCH, based on control information received in the second DCI.

Thus the receive device may obtain control information for the PDSCH scheduling from the second DCI while receiving transmission burst related information on the first DCI, without impact on the standardised DCI format for PDSCH scheduling.

In a third possible implementation of the receive device according to the third aspect, or the first possible implementation of the third aspect, the received DCI comprises a format for PDSCH scheduling in addition to transmission burst information and an indication that the DCI in addition to transmission burst information also comprises control information for the PDSCH scheduling. The receive device is further configured to derive both information related to the data transmission burst and control information for the PDSCH scheduling from the received DCI; and decode any information received on PDSCH, based on control information of the received DCI.

Thus the receive device may obtain control information for the PDSCH scheduling and transmission burst information without increasing blind decoding.

According to a fourth aspect, a method is provided in a receive device for receiving transmission burst information via downlink control signalling from a transmit device. The method comprises receiving a DCI comprising the transmission burst information, wherein the DCI has the same number of bits as a DCI format used for PDSCH scheduling. In addition, the method further comprises deriving the transmission burst information from the received DCI. Further the method comprises determining that the received DCI comprises the transmission burst information based on the indication.

Thereby, thanks to the described aspect, transmission burst information related to a data transmission could be obtained from the transmit device, also for the receive device without PDSCH scheduled, in a LAA network environment. Thereby information is obtained, which may be used for e.g. PDSCH reception, RSRP measurement and/or CSI reporting.

In a first possible implementation of the method according to the fourth aspect, the method further comprises determining that the received DCI comprises transmission burst information based on an indication in the DCI, specifying that the DCI comprises transmission burst information.

Thereby the receive device can distinguish between DCI comprising various types of information.

In a second possible implementation of the method according to the fourth aspect, or the first possible implementation of the fourth aspect, the method further comprises receiving a second DCI comprising a format for PDSCH scheduling, when the receive device is scheduled with PDSCH; deriving control information for PDSCH scheduling from the second DCI and decoding any information received on PDSCH, based on control information received in the second DCI.

Thus the receive device may obtain control information for the PDSCH scheduling from the second DCI while receiving transmission burst related information on the first DCI, without impact on the standardised DCI format for PDSCH scheduling.

In a third possible implementation of the method according to the fourth aspect, or the first possible implementation of the fourth aspect, the received DCI comprises a format for PDSCH scheduling in addition to transmission burst information and an indication that the DCI in addition to transmission burst information also comprises control information for the PDSCH scheduling. The method further comprising deriving both information related to the data transmission burst and control information for the PDSCH scheduling from the received DCI; and decoding any information received on PDSCH, based on control information of the received DCI.

Thus the receive device may obtain control information for the PDSCH scheduling and transmission burst information without increasing blind decoding.

According to a fifth aspect, a computer program is provided with a program code for performing a method according to the second aspect, or any possible implementation thereof, or a method according to the fourth aspect, or any possible implementation thereof when the computer program runs on a computer.

Thereby, thanks to the described aspect, transmission burst information related to a data transmission could be exchanged from the transmit device to the receive device by downlink control signalling, also for the receive device without PDSCH scheduled, in a LAA network environment. Thereby information is obtained, which may be used by the receive device for e.g. PDSCH reception, RSRP measurement and/or CSI reporting.

Other objects, advantages and novel features of the aspects of the invention will become apparent from the following detailed description.

BRIEF DESCRIPTION OF THE DRAWINGS

Various embodiments are described in more detail with reference to attached drawings, illustrating examples of embodiments of the invention in which.

DETAILED DESCRIPTION

Embodiments of the invention described herein are defined as a transmit device, a receive device and methods therein, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
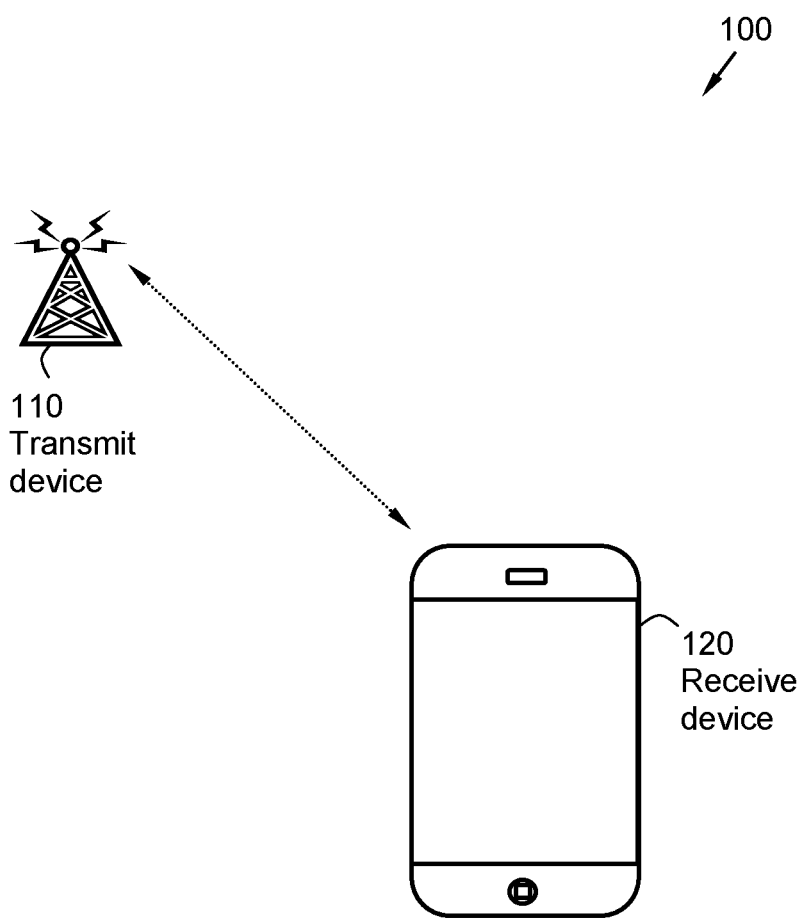
FIG. 1 is a block diagram illustrating a wireless communication network according to an embodiment.

FIG. 1 is a schematic illustration over a wireless communication network 100 comprising a transmit device 110, for communication of signals, data and/or data packets over a wireless interface with a receive device 120.

The transmit device 110 and the receive device 120 may be configured for LAA communication, i.e. to aggregate a primary cell, using licensed spectrum, to deliver critical information and guaranteed Quality of Service, and a co-located secondary cell, using unlicensed spectrum, to opportunistically boost data rate on a best effort basis.

Such primary cell may at least partly be based on e.g. 3GPP LTE, LTE-Advanced, LTE fourth generation mobile broadband standard, Evolved Universal Terrestrial Radio Access Network (E-UTRAN), etc. The secondary cell may be based on e.g. LTE, WiFi or any other non-licensed communication technology, just to mention some few options.

The expressions "wireless communication network", "wireless communication system" and/or "cellular telecommunication system" may within the technological context of this disclosure sometimes be utilised interchangeably.

The transmit device 110 may according to some embodiments be configured for wireless downlink transmission according to LAA and may be referred to, respectively, as e.g., a base station, NodeB, evolved Node Bs (eNB, or eNode B), base transceiver station, Access Point Base Station, base station router, Radio Base Station (RBS), macro base station, micro base station, pico base station, femto base station, Home eNodeB, sensor, beacon device, relay node, repeater or any other network node configured for communication with the receive device 120, over a wireless interface, depending, e.g., of the radio access technology and/or terminology used.

Sometimes, the expression "cell" may be used for denoting the radio network node itself. However, the cell may also in normal terminology be used for the geographical area where radio coverage is provided by the radio network node at a base station site. One radio net-work node, situated on the base station site, may serve one or several cells. The radio net-work nodes may communicate over the air interface operating on radio frequencies with any UE within range of the respective radio network node.

The receive device 120 may correspondingly be configured for wireless reception according to LAA and may be represented by, e.g. a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with one or more transmit device 110, according to different embodiments and different vocabulary.

It is to be noted that the illustrated network setting of one transmit device 110 and one receive device 120 in FIG. 1 is to be regarded as a non-limiting example of an embodiment only. The wireless communication network 100 may comprise any other number and/or combination of transmit devices 110 and/or receive devices 120 may thus be involved in some embodiments of the disclosed invention.

Thus whenever "one" or "a/an" transmit device 110 and/or receive device 120 is referred to in the present context, a plurality of transmit devices 110 and/or receive devices 120 may be involved, according to some embodiments.

One important issue to solve is how the transmit device 110 may transmit downlink control information for facilitating the receive device 120 to perform PDSCH reception, RSRP measurement, and/or CSI reporting.

More specifically, the disclosed solution aims at indicating the transmission burst information not only to a receive device 120 with PDSCH transmission, but possibly also to a receive device 120 without PDSCH transmission for purpose of RSRP/CSI measurement, keeping the signalling overhead low, avoiding increase of the number of (E)PDCCH blind decodes and keeping specification impact small.

A receive device 120 without PDSCH transmission may still be required to report CSI or do RSRP measurement based on the correct information of the transmission burst information, e.g. the CRS/CSI-RS power. In addition, a receive device 120 without PDSCH transmission may benefit from reduced complexity or power saving if some burst information could be indicated (e.g. whether it is MBSFN subframe, Number of subframes after end of DL transmission during which the receive device 120 need not monitor). Thereby energy may be saved at the receiver side.

The transmission burst information may comprise the following information which would be difficult for the receive device 120 to blind decode, i.e. CRS/CSI-RS power and end subframe configuration, i.e. the number of OFDM symbols in the end subframe.

Further, the transmission burst information may also comprise one of the following pieces of information which may be possible for the receive device 120 to blind decode: whether or not a received subframe is an end subframe;

presence of CSI-RS/CSI-IM; CQI/CSI report request; MBSFN subframe or not, or the number of CRS symbols in the subframe; number of expected DL subframes (starting from current subframe) in the ongoing transmission burst; and/or number of subframes after end of DL transmission during which the receive device 120 needs not monitor DL control information and perform CSI measurements.

A receive device 120 without PDSCH may be indicated by the transmission burst information.

A receive device 120 with PDSCH transmission may be indicated by both the transmission burst information, and the DL assignment for PDSCH scheduling, e.g. resource allocation, MCS, etc.

A general concept is to transmit the burst related information using downlink control signalling without increasing the number of (E)PDCCH blind decodes of the receive device 120. The number of blind decodes is not increased if the entire or part of transmission burst information is contained by a DCI format which has the same number of bits as a DCI format used for PDSCH scheduling. In order to differentiate these two types of DC's that have the same number of bits, an indication (which also may be referred to as an indicator) in the DCI format is used to signal if the DCI format is used or not used for PDSCH scheduling (i.e., whether it comprises transmission burst information).

According to one embodiment, the LAA transmit device 110 may transmit a first DCI for transmission burst information and a DCI used for data scheduling, where the first DCI format has the same number of bits as DCI format 0/1A. An indicator in the first DCI format may indicate whether format 0/1A or the first DCI format is used, as will be further discussed and explained in FIGS. 2A and 2B.

According to another embodiment, the LAA transmit device 110 transmits a single second DCI for transmission burst information and the control information for PDSCH scheduling. In order to facilitate for a receive device 120 without scheduled PDSCH to perform RSRP/CSI measurement, an indication may be comprised in the second DCI format to indicate whether the DCI is used only for burst related information or is also used for PDSCH scheduling, as will be further discussed and explained in FIGS. 3A and 3B.

According to another embodiment, the LAA transmit device 110 may transmit a cell-specific control channel, e.g., a Physical Control Format Indicator Channel (PCFICH)-like channel and a third DCI, where the PCFICH-like channel indicates the transmission burst information and the third DCI indicates the control information for PDSCH. The burst information contained in the PCFICH-like channel is thereby obtainable regardless if the receive device 120 transmits PDSCH or not.

In order to keep low signalling overhead and small specification impact, signalling reduction techniques are applied to the CRS/CSI-RS power indication and/or the transmission burst subframe information in all the embodiments.

Figure 2A:
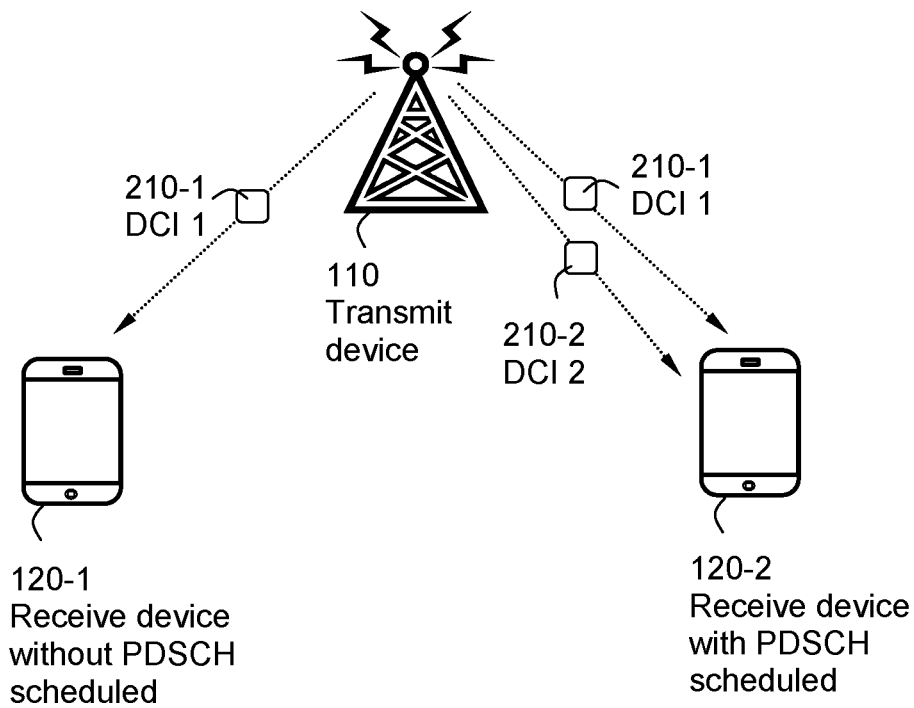
FIG. 2A is a block diagram illustrating a wireless communication network according to an embodiment.

The three above briefly described embodiments will subsequently be more profoundly explained and discussed, starting with the first embodiment, illustrated in FIG. 2A.

In this first embodiment, the transmit device 110 may transmit a first DCI 210-1 comprising transmission burst information, both to the receive device 120-1 without PDSCH scheduled and to the receive device 120-2 with PDSCH scheduled. Further, the transmit device 110 may transmit a second DCI 210-2 comprising data scheduling to the receive device 120-2 with PDSCH scheduled.

Transmission burst information is indicated by the first DCI 210-1 with the same size, i.e. same number of bits, as a DCI format for PDSCH scheduling. Multiple DCI formats could be used for PDSCH scheduling, where the first DCI 210-1 has a size of one DCI format for PDSCH scheduling, such as e.g. DCI format 1A. There may be an indication in the first DCI 210-1 to specify that the first DCI 210-1 is used for the transmission burst information, as further illustrated in FIG. 2B.

Figure 2B:
FIG. 2B is a block diagram illustrating DCI formats according to an embodiment.
Figure 2B:
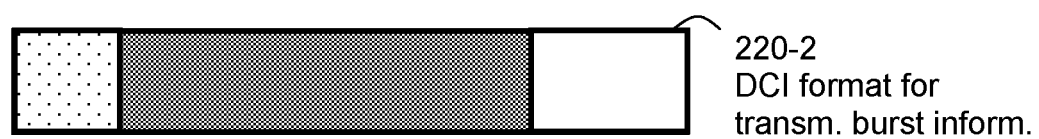

FIG. 2B illustrates a DCI format 220-1 for PDSCH scheduling utilised in the second DCI 210-2 comprising data scheduling. In some embodiments, it may be DCI format 0/1A.

Further, DCI format 220-2 for transmission burst information utilised in the first DCI 210-1 has the same size (same number of bits) as and shares the same receiver specific search space as DCI format 220-1 for PDSCH scheduling, such as e.g. DCI format 0/1A. Thus the transmission burst information may be indicated by a DCI format 220-2 with the same number of bits as DCI format the DCI format 220-1 for PDSCH scheduling, such as e.g. DCI format 0/1A.

Therefore, there may be an indicator in the DCI format 220-2 to indicate whether DCI format 220-1 for PDSCH scheduling or the DCI format 220-2 for transmission burst information is used, in some embodiments. Moreover, to ensure forward capability with LAA uplink, there may be an indicator in the DCI format 220-2 to indicate whether format 0 or the DCI format 220-2 is used in some embodiments. The DCI 210-1, 210-2 may be transmitted using a PDCCH or EPDCCH in different embodiments.

The DCI format 220-2 comprises transmission burst information, where the transmission burst information refers to any layer 1 control information provided for the transmission burst other than the information provided by the DCI 210-2 used for data scheduling, PCFICH and PHICH.

None of the transmission burst information may be comprised in the DCI 210-2 used for data scheduling in some embodiments.

In order for the receive device 120 to be able to receive both the first DCI 210-1 and the second DCI 210-2 used for data scheduling, the receive device 120 is required to monitor the DCI 210-2 used for data scheduling even if it correctly decodes the first DCI 210-1.

As the first DCI 210-1 and the second DCI 210-2 have the same size, i.e. have the same number of bits, the receive device 120 is required to distinguish between them in some way.

In some embodiments, the DCI format 0 may be used to indicate transmission burst information.

In current LTE (e.g. LTE releases 8-12), the receive device 120 performs a certain number of blind decodes for PDCCH/DCI in a UE specific search space for PDSCH scheduling the secondary carrier, where the total number of blind decodes is related to the different DCI sizes (number of bits) to monitor by the receive device 120. Currently there are two downlink DCI sizes to monitor for each configured transmission mode. To ensure the same number of blind decodes, the DCI format 220-2 may be of the same size as the DCI format 220-1 for PDSCH scheduling.

In one implementation, a virtual DCI format 0 may be used for the DCI format 220-2 for transmission burst information, by setting a flag bit for format 0/format 1A differentiation (1 bit), where value 0 indicates format 0 and value 1 indicates format 1A. This bit may be set to zero, in order that the receive device 120 is able to distinguish from the DCI format 220-2 (comprising the burst related information)

and the DCI format 220-1 (for PDSCH scheduling). It may be noted that there is no uplink PUSCH scheduling in the LAA secondary carrier, which means the DCI format 0 in Release 13 is not used for uplink purpose.

It may also be noted in this implementation the first DCI 210-1 is not used to indicate any information for PDSCH scheduling according to the first embodiment, which leaves a large number of unused bits for indicating burst related information.

One example of the DCI format 220-2 may be: Carrier indicator (0 or 3 bits); flag for format 0/format 1A differentiation (1 bit, where value 0 indicates format 0 and value 1 indicates format 1A) set to 0; LAA transmission burst information, Y bits, for indicating LAA burst information; all remaining bits may be set to 0.

One example of LAA transmission burst information may be 1/2 or 4/6 OFDM symbol CRS (1 bit), as illustrated in Table 1:

TABLE 1

| 0 | 1/2 OFDM symbol CRS |
|---|---|
| 1 | 4/6 OFDM symbol CRS |

Equivalently, 1/2 OFDM symbol CRS can be interpreted as MBSFN subframe, and 4/6 OFDM symbol CRS can be interpreted as non-MBSFN subframe.

End subframe type and Number of expected DL subframes (4 bits), as illustrated in Table 2:

TABLE 2

| 0000 | not the end subframe of the burst, 3 more subframes to monitor |
|---|---|
| 0001 | not the end subframe of the burst, 2 more subframes to monitor |
| 0010 | not the end subframe of the burst, 1 more subframe to monitor |
| 0011 | the end subframe of the burst, DwPTS configuration 1 |
| 0100 | the end subframe of the burst, DwPTS configuration 2 |
| ... | ... |
| 1000 | the end subframe of the burst, DwPTS configuration 6 |
| 1001 | the end subframe of the burst, full subframe |

Note that the number of subframes to monitor and the end subframe configuration could be indicated by one information field. More states can be used if the supported maximum occupancy time is greater than 4 ms. The number of subframes to monitor may be interpreted as the number of subframes to monitor starting from the current subframe, or the next subframe. This information may be generalised to the time duration of the downlink burst starting from the current subframe or the next subframe in some embodiments.

Number of subframes after end of DL transmission during which receive device 120 needs not monitor downlink control information and perform CSI measurement (4 bits), see Table 3.

TABLE 3

| 0000 | 0 subframe |
|---|---|
| 0001 | 1 subframe |
| ... | ... |
| 1111 | 15 subframes |

CRS/CSI-RS power (2 bits) as illustrated in Table 4:

TABLE 4

| 00 | +0 dB compared to RRC indicated power level |
|---|---|
| 01 | +1 dB compared to RRC indicated power level |
| 10 | +2 dB compared to RRC indicated power level |
| 11 | +3 dB compared to RRC indicated power level |

Presence of CSI-RS/CSI-IM (1 bit) as illustrated in Table 5. Note whether or not this field exists is related to the decision of aperiodic CSI-RS/CSI-IM.

TABLE 5

| 0 | Present |
|---|---|
| 1 | Not present |

Presence of DRS for EPDCCH/PDSCH rate matching (1 bit) as illustrated in Table 6. Note whether or not this field exists is related to the decision of multiplexing of PDSCH and DRS in subframe other than subframe #0/5.

TABLE 6

| 0 | Present |
|---|---|
| 1 | Not present |

The receive device 120, when correctly receiving the first DCI 210-1 comprising burst related information, may continue monitoring the second DCI 210-2 used for data scheduling, where the monitored DCI formats 220-1, 220-2 are related to the configured transmission mode.

This is advantageous as there may be no change to the existing DCI format 1A, and no increase of PDCCH blind decodes.

However, in some other embodiments, an additional bit other than the one flag bit (flag for format 0/format 1A differentiation), to indicate the DCI usage may be added. For example, the "Flag for format 0/format 1A differentiation" field comprises two bits, and there is one code point to indicate that the DCI format 220-2 for transmission burst information is used. The additional bit may be any bit other than the existing 1 bit "Flag for format 0/format 1A differentiation", e.g. a padding bit or a new information bit.

A corresponding change to format 1A and format 0 may be made, using the same additional bit to indicate the DCI usage in some embodiments. Hence, the number of blind decodes is not increased by the added bit.

This is advantageous as forward compatibility to DCI format 0 used for uplink PUSCH scheduling can be ensured.

In some further embodiments, the first DCI 210-1 and the second DCI 210-2 may be distinguished by scrambling the first DCI 210-1 by a Radio Network Temporary Identifier (RNTI) other than Cell-RNTI (C-RNTI), i.e. the indication is implicitly comprised using a RNTI other than C-RNTI.

One example is that the DCI format 220-2 may be scrambled by a RNTI other than C-RNTI, e.g. System Information RNTI (SI-RNTI), Paging RNTI (P-RNTI), Random Access RNTI (RA-RNTI). The first DCI 210-1 is sent from UE specific search space. The first DCI 210-1 may have the same size (i.e. the same number of bits) as DCI format 0/1A. It may be noted it is different from conventional solutions that a DCI format scrambled with SI-RNTI, P-RNTI or RA-RNTI is always transmitted in the common search space.

This is advantageous as there may be no change to the existing DCI format 1A and no increase of (E)PDCCH blind decodes.

In some further embodiments, a pre-defined code point may be used to indicate the DCI type (i.e. first DCI 210-1 or second DCI 210-2), without using additional bits.

The pre-defined code point may thus indicate that the DCI 210-1 is used for burst transmission. This pre-defined code point is at least one information bit of the DCI format 220-1, 220-2 which is non-valid or non-used for downlink assignment/uplink grant used for scheduling purpose. In this case, no additional bits other than 1 bit "Flag for format 0/format 1A differentiation" are introduced for purpose of the DCI usage indication.

For the case "Flag for format 0/format 1A differentiation" is "0", the receive device 120 may interpret the received DCI format 220-1, 220-2 as the DCI format 220-2 by one or several of the following:

Resource block assignment and hopping resource allocation $\lceil \log_2(N(N+1)/2) \rceil$ bits set to "X", where X is a $\lceil \log_2(N(N+1)/2) \rceil$ bit binary value which is invalid and corresponds to a decimal value not smaller than (N(N+1)/2), N is a pre-defined integer and equals the uplink transmission bandwidth, or the downlink transmission bandwidth if there is no associated uplink carrier configured. The number of valid states for the resource allocation is (N(N+1)/2). Table 7 shows that for different bandwidth options, there are several invalid states not used to indicate the correct/consistent resource assignment. This is advantageous as only (N(N+1)/2) states can be used to indicate all the states of the uplink resource allocation, leaving $2^{\lceil \log_2(N(N+1)/2) \rceil} - (N(N+1)/2)$ states not used. One example is all the bits in "X" set to 1, or all the bits set to 1 except the LSB set to 0.

TABLE 7

| | All bits | Number of valid states | Number of invalid states |
|---|---|---|---|
| 25 | 9 | 325 | 187 |
| 50 | 11 | 1275 | 773 |
| 75 | 12 | 2850 | 1246 |
| 100 | 13 | 5050 | 3142 |

Further, invalid point corresponding to combination of MCS and NDI: In the uplink grant DCI, MCS has five bits to represent 32 states in which the last 3 states (MCS=29/30/31) are used for retransmission without the indication of transport block size and modulation scheme. When the user equipment receives one of the last three states, the receive device 120 knows that the retransmission of a previous transmit block is needed and refers to the last DCI transmission to obtain the transmission block size and modulation scheme. NDI indicates if the transport block should be new or retransmitted one. In a normal UL grant, when one of the last states of MCS is transmitted in DCI, NDI is not toggled (as compared to earlier transmission) to indicate the retransmission. Hence the combination of MCS=29/30/31 and NDI being toggled is not valid for normal data transmission and scheduling and can be used to indicate the DCI format 220-2 for transmission burst information.

For the case "Flag for format 0/format 1A differentiation" is "1", the receive device 120 may interpret the received DCI format 220-1, 220-2 as the DCI format 220-2 for transmission burst information by one or several of the following:

Localised/Distributed VRB assignment flag (1 bit) is set to "0" or "1", and Resource block assignment bits set to "Y", where Y is a $\lceil \log_2(M(M+1)/2) \rceil$ bit binary value which corresponds to a decimal value not smaller than (M(M+1)/2), M is a pre-defined integer and equals the downlink transmission bandwidth. It shall be noted that the code point "Localised/Distributed VRB assignment flag" (1 bit) is set to "0", and "Resource block assignment", all bits set to "1" is already used by DCI format 1A for triggering 1/14 Physical Random Access Channel (PRACH). However, it may be reused for purpose of indicating the DCI format 220-2 as the original use is not valid and the PRACH procedure may be triggered by the PCell DCI. To still be able to distinguishable from the DCI format 1A usage, the mentioned code point for triggering PRACH may be avoided.

Invalid point corresponding to combination of MCS and NDI: Similar to UL grant discussed previously, the combination of MCS=29/30/31 and NDI being toggled is not valid for data scheduling and could be used to indicate the DCI format 220-2, i.e. the DCI 210-1 comprising only burst related information.

This embodiment may be advantageous, as forward compatibility to DCI format 0 used for uplink PUSCH scheduling can be ensured, and there is no increase of information bits.

One example of reusing Rel-12 DCI format 1A for LAA burst information is to set the information bits as below: carrier indicator (0 or 3 bits); flag for format 0/format 1A differentiation (1 bit), where value 0 indicates format 0 and value 1 indicates format 1A.

Format 1A may be used for indicating LAA transmission burst information only if format 1A CRC is scrambled with C-RNTI and all the remaining fields are set as follows: localised/distributed VRB assignment flag (1 bit is set to "1"); resource block assignment $\lceil \log_2(N_{RB}^{DL}(N_{RB}^{DL}+1)/2) \rceil$ bits, where all bits may be set to 1; LAA transmission burst information (Y bits), used to indicate LAA burst information; all remaining bits may be set to 0.

Otherwise, DCI format 1A may be used for PDSCH scheduling where: localised/distributed VRB assignment flag (1 bit); resource block assignment $\lceil \log_2(N_{RB}^{DL}(N_{RB}^{DL}+1)/2) \rceil$ bits; the remaining information fields in the legacy DCI format 1A.

The LAA burst information may be put after the information field related to resource allocation, and after the information bits used for indicating the DCI usage.

For the scheduled receive devices 120-2 receiving both the first DCI 210-1 (comprising burst related information) and the second DCI 210-2 (comprising scheduling information): the receive device 120-2 derives the burst related information from the first DCI 210-1 and may use the corresponding information for RSRP/CSI measurement, and for decoding the PDSCH associated with the second DCI 210-2.

For the non-scheduled receive devices 120-1 receiving only the first DCI 210-1: the receive device 120-1 derives the burst related information from the first DCI 210-1 and may use the corresponding information for RSRP/CSI measurements.

For the receive devices 120-2 receiving only the second DCI 210-2: the receive device 120-2 may use the burst related information from the latest valid DCI 210-1 of the DCI type 220-2 for transmission burst information, or a default value or a Radio Resource Control (RRC) configured value, possibly for RSRP/CSI measurement, and for decoding PDSCH associated with the second DCI 210-2.

This solution may be advantageous as the receive device 120 is still able to perform RSRP/CSI measurement and PDSCH decoding even when the transmitter device 110 does not transmit the first DCI 210-1, which saves the control signalling overhead.

Figure 3A:
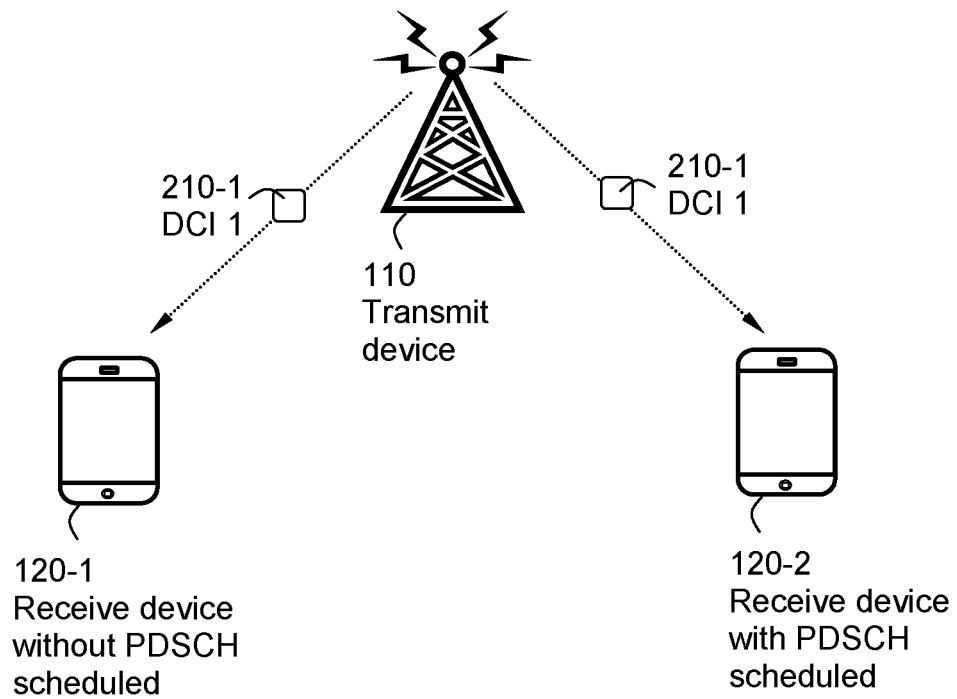
FIG. 3A is a block diagram illustrating a wireless communication network according to an embodiment.

According to a second embodiment, a DCI 210-1 may be transmitted comprising both burst related information and PDSCH scheduling information, as illustrated in FIG. 3A.

Thus the LAA transmit device 110 may transmit one single DCI 210-1 for both burst related information and the control information for PDSCH. In order to help a receive device 120-1 without PDSCH scheduled to perform RSRP/CSI measurement, there may be an indication in the utilised DCI format to indicate whether the DCI 210-1 comprises only burst related information or also comprises PDSCH scheduling information.

The DCI format according to the second embodiment may have a fixed size/number of bits, regardless whether it only comprises burst related information, or burst related information and in addition control information for the PDSCH scheduling. If the DCI format only comprises burst related information, the bits corresponding to the PDSCH scheduling can be set to predefined values, which improve the decoding reliability of the DCI 210-1 as those predefined values can be taken as virtual Cyclic Redundancy Check (CRC) bits.

It may be noted that in this second embodiment, the DCI 210-1 is also used to indicate any information for PDSCH scheduling. Therefore, it may be beneficial to reduce the bits used for burst related information, and/or add some additional information bits to the existing DCI format 1A by setting the information bits as below: carrier indicator (0 or 3 bits); flag for format 0/format 1A differentiation (1 bit), where value 0 indicates format 0 and value 1 indicates format 1A.

Format 1A is used for indicating LAA burst control information only if format 1A CRC is scrambled with C-RNTI and all the remaining fields are set as follows: localised/distributed VRB assignment flag (1 bit), set to "1"; resource block assignment $\lceil \log_2(N_{RB}^{DL}(N_{RB}^{DL}+1)/2) \rceil$ bits, where all bits may be set to 1; LAA transmission burst information (Y bits), used to indicate LAA burst information. All the remaining bits may be set to zero.

Otherwise, i.e. when the DCI according to the second embodiment comprises both burst related information and PDSCH scheduling information: localised/distributed VRB assignment flag (1 bit); resource block assignment $\lceil \log_2(N_{RB}^{DL}(N_{RB}^{DL}+1)/2) \rceil$ bits; LAA transmission burst information (Y bits), used to indicate LAA burst information; all the remaining information fields in the legacy DCI format 1A.

Figure 3B:
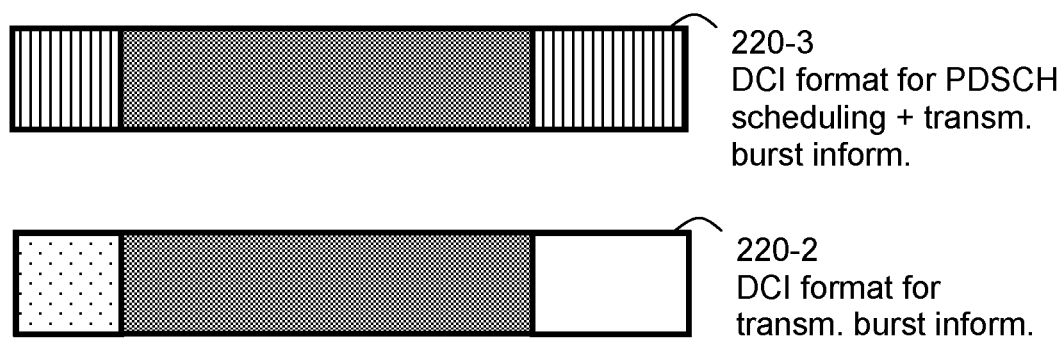
FIG. 3B is a block diagram illustrating DCI formats according to an embodiment.

FIG. 3B illustrates a DCI format 220-2 used for the transmission burst information only, and another DCI format 220-3, used for both the transmission burst information and PDSCH scheduling. There may be an indication in the DCI 210-1 to indicate the DCI 210-1 used for the transmission burst information.

Similarly, as in the example above, the DCI 210-1 according to the second embodiment also results in extension of DCI format X, where in the DCI format X the information bits for LAA burst information may be added to the DCI format X, e.g. immediately after the information field "Resource block assignment". Note that DCI format X is related to the configured transmission mode, e.g. DCI format X is DCI format 2C if the transmission mode 9 is configured.

There may be no indication for burst related information only if the DCI format 220-2, 220-3 according to the second embodiment has a different number of information bits than DCI format 1A, e.g. the DCI format 220-2, 220-3 has a same number of information bits as DCI format 2C if configured in a transmission mode allowing the use of DCI format 2C, e.g. transmission mode 9.

This is advantageous in terms of signalling overhead as only the small payload size DCI format (i.e. format 1A) may be allowed to indicate the burst related information only, in some embodiments.

It may be noted in this implementation, the DCI 210-1 according to the second embodiment is also used to indicate any information for PDSCH scheduling, using the DCI format 220-3. Therefore it is beneficial to reduce the bits used for burst related information. As indicated in the signalling part, one example is that 6 bits are added, with 2 bits indicating the CRS/CSI-RS power and 4 bits indicating the end subframe configuration.

The indication in the DCI format 220-2, 220-3 according to the second embodiment, to differentiate from different usage could be any one of implementations mentioned in embodiment 1. Thus the indication in the DCI format 220-2, 220-3 according to the second embodiment to differentiate from different usage may be any one of the above discussed and presented implementations mentioned in conjunction with the first embodiment.

For the receive devices 120 receiving the DCI according to the second embodiment for both burst related information and PDSCH scheduling: the receive device 120 may derive the burst related information and the downlink grant from the received DCI and may use the corresponding information for RSRP/CSI measurement, and for decoding PDSCH.

For the receive devices 120 receiving the DCI according to the second embodiment for the burst related information only: the receive device 120 may derive the burst related information from the received DCI and may use the corresponding information for RSRP/CSI measurement.

According to a third embodiment, a cell-specific control channel may be utilised for burst related information and a DCI 210-2 for providing PDSCH scheduling information.

This embodiment is that an LAA transmit device 110 transmits a cell-specific control channel, such as e.g. a Physical Control Format Indicator Channel (PCFICH), or a PCFICH-like channel, and a DCI 210-2 according to the third embodiment, where the cell-specific control channel indicates the burst related information and the DCI 210-2 indicates the control information for PDSCH. The DCI 210-2 may have the previously discussed DCI format 220-1 for PDSCH scheduling.

The receive device 120, when receiving the cell-specific control channel but not the DCI 210-2, may be expected to perform RSRP/CSI measurement. The receive device 120, when receiving both the cell-specific control channel and the DCI format 220-1, may be able to perform both RSRP measurement and CQI report.

One implementation of the cell-specific control channel is a PCFICH-like channel, in some embodiments.

The PCFICH-like channel may be defined as a physical channel or signal using at least the same format and/or the same mapping to the resource elements as PCFICH. The PCFICH-like channel may be a LTE Release-8 to Release 12 PCFICH channel with interpreting that the PCFICH is used for indicating the burst related information. The control length region, the starting symbol position of the PDSCH and the starting symbol position of the EPDCCH could be configured by RRC signalling, if the PCFICH is used for burst related information.

The PCFICH-like channel can be used by the receive device 120 to indicate burst related information or part of burst related information. Since the PCFICH-like channel may only contain 4 states, it may be used for the essential control information. More specifically, The PCFICH-like channel may be used to indicate at least one of: End subframe configuration, i.e. the number of OFDM symbols in the end subframe; and/or CRS/CSI-RS power.

In one example, states of the PCFICH may correspond to RRC configured information (e.g., CRS/CSI-RS power, end subframe configuration etc.).

One example is that some states of the PCFICH may be used to indicate the burst related information, e.g. a PCFICH with the associated Control Format Indicator (CFI) equal to 3. Such a state could directly correspond to burst related information, or an RRC configuration comprising burst related information in some embodiments.

Furthermore, in LTE, only 3 out of the 4 states of the PCFICH is currently used. Hence, in one example, at least the fourth state may be used for indicating burst related information, while at least one of the states may be used as defined for the PCFICH.

This is advantageous as the PCFICH-like channel is cell-specific shared but all the receive devices 120, which reduces the signalling overhead by not necessary to send every receive device 120 a UE-specific DCI 210.

The DCI format 220-1 according to the third embodiment may be either a legacy DCI without any additional information related to the transmission burst in some embodiments, or a new DCI format comprising partial burst related information in addition to the information contained in the PCFICH like channel in other embodiments. The partial burst related information may be any information related to the burst transmission in addition to those transmitted in the PCFICH channel, e.g. the aperiodic CSI request and/or the presence of CSI-RS/CSI-IM, in different embodiments.

The DCI format 220-1 according to the third embodiment comprising partial burst related information according to some embodiments is advantageous, as some information bits related to the burst not contained in the PCFICH-like channel only capable of transmitting a small number of bits (such as e.g. 2), may be indicated in the DCI format 220-1 according to the third embodiment, which helps the receive device 120 to acquire the full burst related information and therefore helps the PDSCH demodulation and RSRP/CSI measurements.

The signalling design for burst related information may help to further reduce the control channel overhead, which applies for all the embodiments in the present invention.

One example of the third DCI format 220-1 may be to add some additional information bits to the existing DCI format 1A by setting the information bits as below: carrier indicator (0 or 3 bits); flag for format 0/format 1A differentiation (1 bit), where value 0 indicates format 0 and value 1 indicates format 1A; localised/distributed VRB assignment flag (1 bit); resource block assignment $\lceil \log_2(N_{RB}^{DL}(N_{RB}^{DL}+1)/2) \rceil$ bits; remaining LAA transmission burst information (Z bits), used to indicate the remaining LAA burst information in addition to the information indicated by PCFICH; all the remaining information fields in the legacy DCI format 1A.

Similarly, as in the example above, the third DCI 210 also results in extension of DCI format X, where in the DCI format X the information bits for remaining LAA burst information may be added to the DCI format X, e.g. immediately after the information field "Resource block assignment".

The signalling design helps to further reduce the control channel overhead, which applies for all the herein disclosed embodiments.

In one embodiment, the burst information is encoded by the bits conveyed by the methods (e.g., a DCI or a PCFICH-like channel) in the previous embodiments.

In another embodiment, at least some of the bits conveyed by the methods (e.g., a DCI or a PCFICH-like channel) in the previous embodiments are associated with RRC configured states and an RRC state describes a part of the burst information. This is advantageous as it may limit the amount of bits which need to be signalled, while allowing the transit device 110 to reconfigure the RRC states when needed.

In some embodiments the end subframe type, configuration and the number of subframe to monitor may be signalled to the receive device by jointly encoding. This may be made for DCI 210 according to any of the above discussed embodiments.

As a DL transport block in the last subframe of a DL transmission burst may be transmitted using DwPTS structure, or a full subframe. There are a number of DwPTS structures, e.g. 6 which consists of 3, 6, 9, 10, 11 and/or 12 OFDM symbols.

One implementation comprises to jointly encode at least two of the following three pieces of information: whether or not the current subframe is the end subframe; the end subframe configuration, i.e. the number of OFDM symbols of the end subframe and/or the number of the subframes to monitor. Joint encoding can be also interpreted as the information shares the same information field in the DCI format, according to some embodiments.

Assuming the maximum occupancy time is 4 subframes, one example of mapping bits to the information may be illustrated in Table 8:

TABLE 8

| | |
|---|---|
| 0000 | not the end subframe of the burst, 3 more subframe to monitor |
| 0001 | not the end subframe of the burst, 2 more subframe to monitor |
| 0010 | not the end subframe of the burst, 1 more subframe to monitor |
| 0011 | the end subframe of the burst, DwPTS configuration 1 |
| 0100 | the end subframe of the burst, DwPTS configuration 2 |
| . . . | . . . |
| 1000 | the end subframe of the burst, DwPTS configuration 6 |
| 1001 | the end subframe of the burst, full subframe |

This is advantageous in terms of signalling overhead, as the number of information bits by joint encoding is 4 bits, while 6 bits are required for separate encoding (1 bit for whether or not the current subframe is the end subframe, 2 bit for the number of subframes to monitor, 3 bits for the end subframe configuration).

One example is that only one code point indicating "not the end subframe" for the case there is at least 1 more subframe to monitor, as exemplified in Table 9.

TABLE 9

| | |
|---|---|
| 000 | not the end subframe of the burst |
| 001 | the end subframe of the burst, DwPTS configuration 1 |
| 010 | the end subframe of the burst, DwPTS configuration 2 |
| . . . | . . . |
| 110 | the end subframe of the burst, DwPTS configuration 6 |
| 111 | the end subframe of the burst, full subframe |

One example is that there are only two code points indicating "not the end subframe" for the case there is at least 1 more subframe to monitor, while one code point indicates the maximum number of subframes pre-defined or configured by RRC, the other one code point indicates there is for the case there is at least 1 more subframe to monitor, as illustrated in Table 10.

TABLE 10

| | |
|---|---|
| 0000 | not the end subframe of the burst, X-1 more subframes to monitor where X is pre-defined or configured by RRC |
| 0001 | not the end subframe of the burst, |
| 0010 | the end subframe of the burst, DwPTS configuration 1 |
| 0011 | the end subframe of the burst, DwPTS configuration 2 |
| ... | ... |
| 0111 | the end subframe of the burst, DwPTS configuration 6 |
| 1000 | the end subframe of the burst, full subframe |

One example may be that joint RRC configuration and physical layer signalling may be used to indicate the end subframe configuration. This could be done as illustrated in Table 11, by:

TABLE 11

| | | |
|---|---|---|
| RRC Signalling 1 | 00 | the end subframe of the burst, DwPTS configuration 1 |
| | 01 | the end subframe of the burst, DwPTS configuration 3 |
| | 10 | the end subframe of the burst, DwPTS configuration 5 |
| | 11 | the end subframe of the burst, full subframe |
| RRC Signalling 2 | 00 | the end subframe of the burst, DwPTS configuration 2 |
| | 01 | the end subframe of the burst, DwPTS configuration 4 |
| | 10 | the end subframe of the burst, DwPTS configuration 6 |
| | 11 | the end subframe of the burst, full subframe |

This is advantageous in terms of signalling overhead.

According to some embodiments, the CRS/CSI-RS power may be given by:

$$P = P_0 + \text{delta}$$

where P is the CRS or CSI-RS power, $P_0$ is the power indicated by RRC signalling, delta is power offset derived from the physical layer signalling, and/or from the number of configured/activated Secondary Cells (SCells) and/or the number of SCells having transmission burst simultaneously.

One example of delta is always non-negative, e.g. 0 dB, 1 dB, 2 dB, 3 dB, indicated by 2 bits. $P_0$ can be given assuming all the SCells have ongoing transmissions, which could be the minimum value of power level of CRS/CSI-RS. By this way the most common cases with equal or increased CRS/CSR-RS power compared to $P_0$ can be supported by the signalling. This is advantageous that signalling overhead is reduced by not having any negative value.

One example is that delta is derived from $\text{Num}_{total}$, the number of configured/activated LAA SCells, and/or $\text{Num}_{burst}$, the number of SCells having transmission burst simultaneously. delta is given by:

$$\text{delta} = f(\text{Num}_{total}, \text{Num}_{burst})$$

and $$f(\text{Num}_{total}, \text{Num}_{burst}) = \text{floor}(\log_2(\text{Num}_{total}/\text{Num}_{burst}))$$

where floor(x) represents the largest integer not larger than x.

According to one embodiment, delta may be derived from a fixed number of information bits provided by the control information, and a variable power step size related to $\text{Num}_{total}$, the number of configured/activated SCells, and/or $\text{Num}_{bit}$, i.e. the number of information bits used for the power indication; delta may be given by:

$$\text{delta} = P_1 * \text{StepSize}$$

and $$\text{StepSize} = g(\text{Num}_{total}, \text{Num}_{bit})$$

and $$g(\text{Num}_{total}, \text{Num}_{bit}) = \text{floor}(\log_2(\text{Num}_{total})/(2^{\text{Num}_{bit}}))$$

where floor(x) represents the largest integer not larger than x, $P_1$ is the indicated value from the physical layer signalling.

For the receive devices 120 receiving both the PCFICH-like channel and the DCI 210 according to the third embodiments:

The receive device 120 may derive the burst related information from the DCI 210 and may use the corresponding information for RSRP/CSI measurement, and for decoding PDSCH associated with the DCI 210.

For the receive devices 120 receiving only the PCFICH-like channel:

The receive device 120 derives the burst related information from the PCFICH-like channel and may use the corresponding information for RSRP/CSI measurement.

Figure 4:
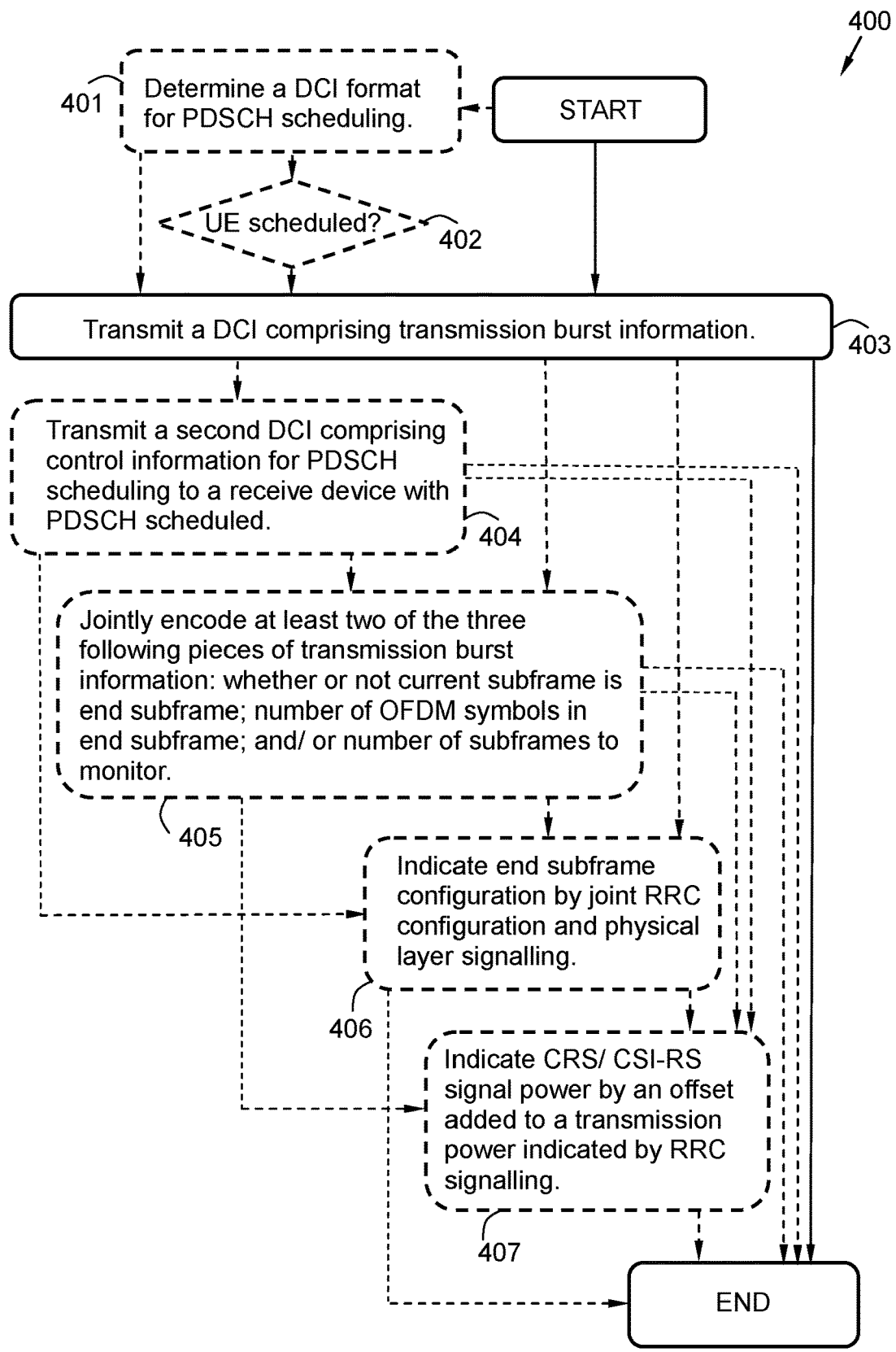
FIG. 4 is a flow chart illustrating a method in a transmit device according to an embodiment of the invention.

FIG. 4 is a flow chart illustrating embodiments of a method 400 in a transmit device 110, for providing transmission burst information to a receive device 120 by downlink control signalling.

The transmit device 110 and the receive device 120 may be comprised in a wireless communication network 100. Such wireless communication network 100 may be based on LAA.

The transmission burst information may comprise any of: end subframe configuration; power of a CRS and/or CSI-RS; whether or not the current subframe is the end subframe; 1/2 or 4/6 OFDM symbol CRS, MBSFN or non-MBSFN; number of expected downlink subframes, starting from the current subframe, in the ongoing transmission burst; number of subframes after end of the downlink transmission, or the time duration, during which the receive device 120 need not detect transmission, monitor DCI and perform CSI measurements; presence of CSI-RS/CSI-IM; or presence of DRS, for EPDCCH/PDSCH rate matching, according to different embodiments. The end subframe type and configuration may be the number of DL transport block in the last subframe of a DL transmission burst, in some embodiments.

It may be a particular advantage when the transmission burst information of the DCI 210-1 comprises end subframe configuration and/or power of a CRS and/or CSI-RS, in some embodiments, as this information may be used also by a receiver device 120 not being scheduled on PDSCH.

To appropriately provide the transmission burst information to the receive device 120, the method 400 may comprise a number of actions 401-407.

It is however to be noted that any, some or all of the described actions 401-407, may be performed in a somewhat different chronological order than the enumeration indicates, be performed simultaneously or even be performed in a completely reversed order according to different embodiments. Further, it is to be noted that some actions 401-407 may be performed only in some alternative embodiments, such as e.g. action 402 and/or 404-407, but not necessarily all embodiments. The method 400 may comprise the following actions:

Action 401 which only may be performed in some embodiments, may comprise determining a DCI format 220-1 used for PDSCH scheduling, such as e.g. DCI format 1A, DCI format 0, etc.

Action 402 which only may be performed in some embodiments, may comprise determining whether a receive device 120-2 is scheduled or not on PDSCH. Based on this determination, DCI 210-1 of different DCI formats 220-1, 220-2, 220-3 may be transmitted Action 403 comprises transmitting a DCI 210-1 comprising the transmission burst information, wherein the DCI 210-1 has the same number of bits as the DCI format 220-1 used for PDSCH scheduling.

In some embodiments, the DCI 210-1 may comprise an indication specifying that the DCI 210-1 comprises the transmission burst information.

In some embodiments, the DCI 210-1, 210-2 may be transmitted comprising both the transmission burst information and control information for PDSCH scheduling when it is transmitted to a receive device 120-2 with PDSCH scheduled.

In some embodiments, the DCI 210-1, 210-2 may comprise the same number of bits, regardless if it comprises only the transmission burst information, or if it also comprises control information for PDSCH scheduling.

In some embodiments, wherein the receive device 120-2 is not scheduled on PDSCH, the DCI 210-1 comprising a format 220-2 for transmission burst information may be transmitted.

In some embodiments, wherein the receive device 120-2 is scheduled on PDSCH, the DCI 210-1 comprising a format 220-3 for PDSCH scheduling in addition to transmission burst information.

The indication may in some embodiments specify that the DCI 210-1, 210-2 comprises the transmission burst information comprises a flag indicating that DCI format 0 is used.

The indication may in some embodiments specify that the DCI 210-1, 210-2 comprises the transmission burst information is comprised in a bit other than the flag indicating DCI format 0/1A is used.

The indication may in some embodiments comprise a pre-defined code point. Such pre-defined code point may be an invalid state derived from the resource assignment information in the DCI 210-1, 210-2, in some embodiments.

Action 404, which may be performed only in some alternative embodiments, may comprise transmitting a second DCI 210-2 comprising control information for PDSCH scheduling to a receive device 120-2 with PDSCH scheduled. The second DCI 210-2 may have a format 220-1 dedicated for PDSCH scheduling in some embodiments, such as e.g. format 1A in some alternative embodiments.

Action 405, which may be performed only in some alternative embodiments, may comprise jointly encoding at least two of the three following pieces of the transmission burst information: whether or not the current subframe is the end subframe; the end subframe configuration; and/or the number of subframes to monitor.

Action 406, which may be performed only in some alternative embodiments, may comprise indicating the end subframe configuration by joint RRC configuration and physical layer signalling, according to some embodiments.

Action 407, which may be performed only in some alternative embodiments, may comprise indicating the CRS/CSI-RS signal power by providing a non-negative value as an offset to be added to a transmission power indicated by RRC signalling.

Figure 5:
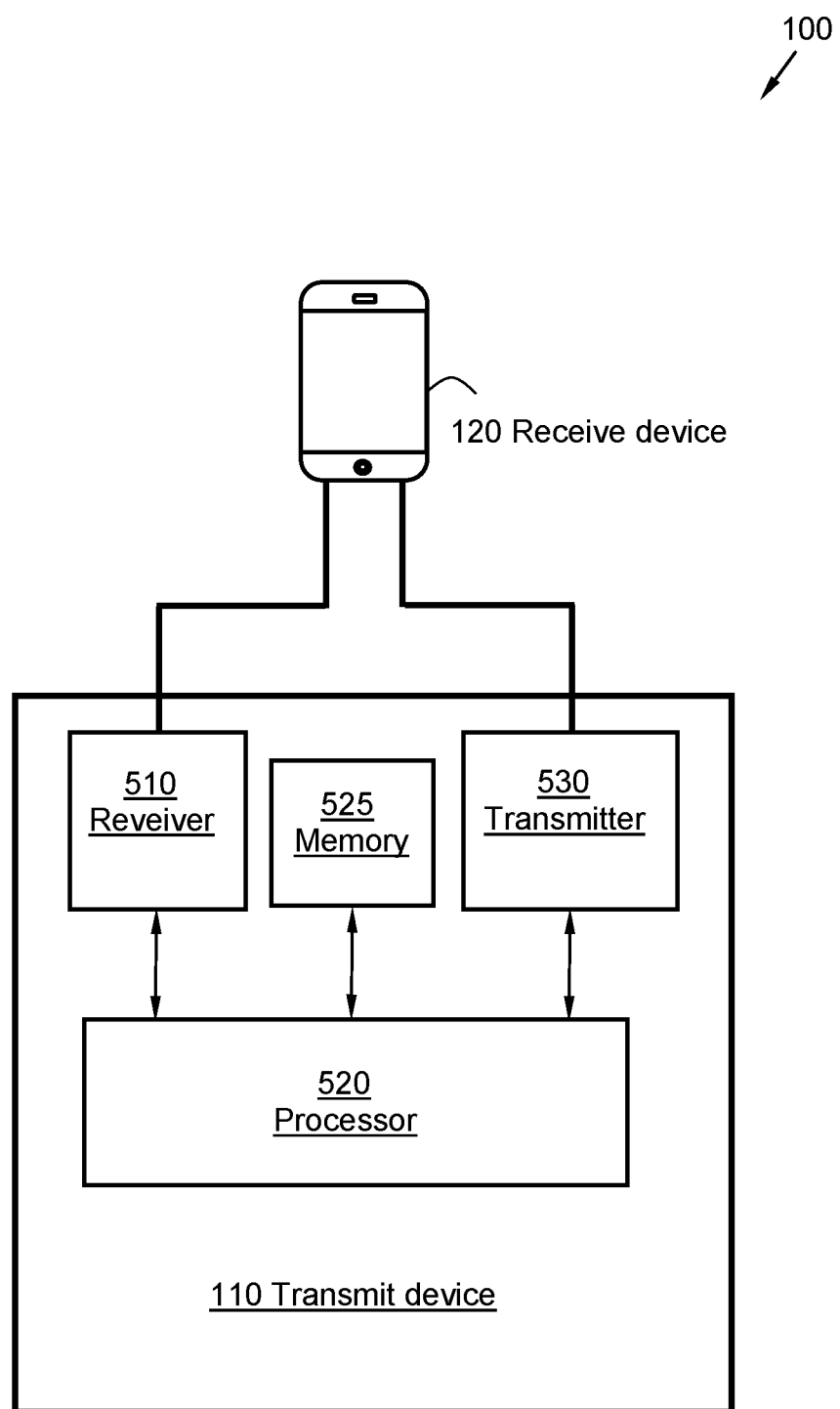
FIG. 5 is a block diagram illustrating a transmit device according to an embodiment of the invention.

FIG. 5 illustrates an embodiment of a transmit device 110 for providing transmission burst information to a receive device 120 by downlink control signalling, by performing the previously described method 400 according to at least one of the previously described actions 401-407.

The transmit device 110 is configured to transmit a DCI 210-1, comprising transmission burst information, wherein the DCI 210-1 has the size (same number of bits) of the DCI format 220-1 used for PDSCH scheduling. Further, in some embodiments, the transmit device 110 may be additionally configured to determine a DCI format 220-1 used PDSCH scheduling such as e.g. format 0/1A or similar in various embodiments.

In some embodiments, the DCI 210-1 may comprise an indication specifying that the DCI 210-1 comprises the transmission burst information.

The transmission burst information may comprise any of: end subframe configuration; power of a CRS and/or CSI-RS; whether or not the current subframe is the end subframe; 1/2 or 4/6 OFDM symbol CRS, MBSFN or non-MBSFN; number of expected downlink subframes, starting from the current subframe, in the ongoing transmission burst; number of subframes after end of the downlink transmission, or the time duration, during which the receive device 120 need not detect transmission, monitor DCI and perform CSI measurements; presence of CSI-RS/CSI-IM; or presence of DRS, for EPDCCH/PDSCH rate matching, according to different embodiments. The end subframe type and configuration may be the number of DL transport block in the last subframe of a DL transmission burst, in some embodiments.

The transmit device 110 may also be further configured to transmit the DCI 210-1 comprising both the transmission burst information and control information for PDSCH scheduling when it is transmitted to a receive device 120-2 with PDSCH scheduled in some embodiments.

Furthermore, the DCI 210-1 may comprise the same number of bits, regardless if it comprises only the transmission burst information, or if it also comprises control information for PDSCH scheduling.

According to some embodiments, the transmit device 110 may also be further configured to transmit a second DCI 210-2 comprising control information for PDSCH scheduling to a receive device 120-2 with PDSCH scheduled.

Also, the indication specifying that the DCI 210-1, 210-2 comprises the transmission burst information may comprise a flag indicating that DCI format 0 is used.

Further, the indication specifying that the DCI 210-1, 210-2 comprises the transmission burst information may be comprised in a bit other than the flag indicating DCI format 0/1A is used.

In further addition, the indication specifying that the DCI 210-1, 210-2 comprises the transmission burst information may comprise a pre-defined code point in some embodiments.

Further, the pre-defined code point is an invalid state derived from the resource assignment information in the DCI 210-1, 210-2.

The transmit device 110 may be further configured to jointly encode at least two of the three following pieces of the transmission burst information: whether or not the current subframe is the end subframe; the end subframe configuration; and/or the number of subframes to monitor.

Furthermore, according to some embodiments, the transmit device 110 may be further configured to indicate the end subframe configuration by joint RRC configuration and physical layer signalling.

The transmit device 110 may be further configured to indicate the CRS/CSI-RS signal power by providing a non-negative value as an offset to be added to a transmission power indicated by RRC signalling.

The transmit device 110 may comprise a processor 520. The processor 520 is configured to perform at least some of the above described actions 401-405, when loaded into the processor 520.

Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The transmit device 110 also comprises a transmitting circuit 530, configured to transmit the DCI 210-1, comprising the transmission burst information, wherein the DCI 210-1 has the size (same number of bits) of a DCI format 220-1 used for PDSCH scheduling.

Furthermore, the transmit device 110 also may comprise a receiving circuit 510 in some embodiments, for receiving wireless signalling.

The method 400 comprising the actions 401-407 may be implemented through the one or more processors 520 in the transmit device 110 together with computer program product for performing the functions of the method 400, for providing transmission burst information to a receive device 120 by downlink control signalling.

Thus a computer program comprising program code for performing the method 400 according to any embodiment of actions 401-407, may be performed when the computer program is loaded in the processor 520.

The computer program product mentioned above may be provided for instance in the form of a data carrier carrying computer program code for performing at least some of the actions 401-407 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the transmit device 110, e.g., over an Internet or an intranet connection.

Figure 6:
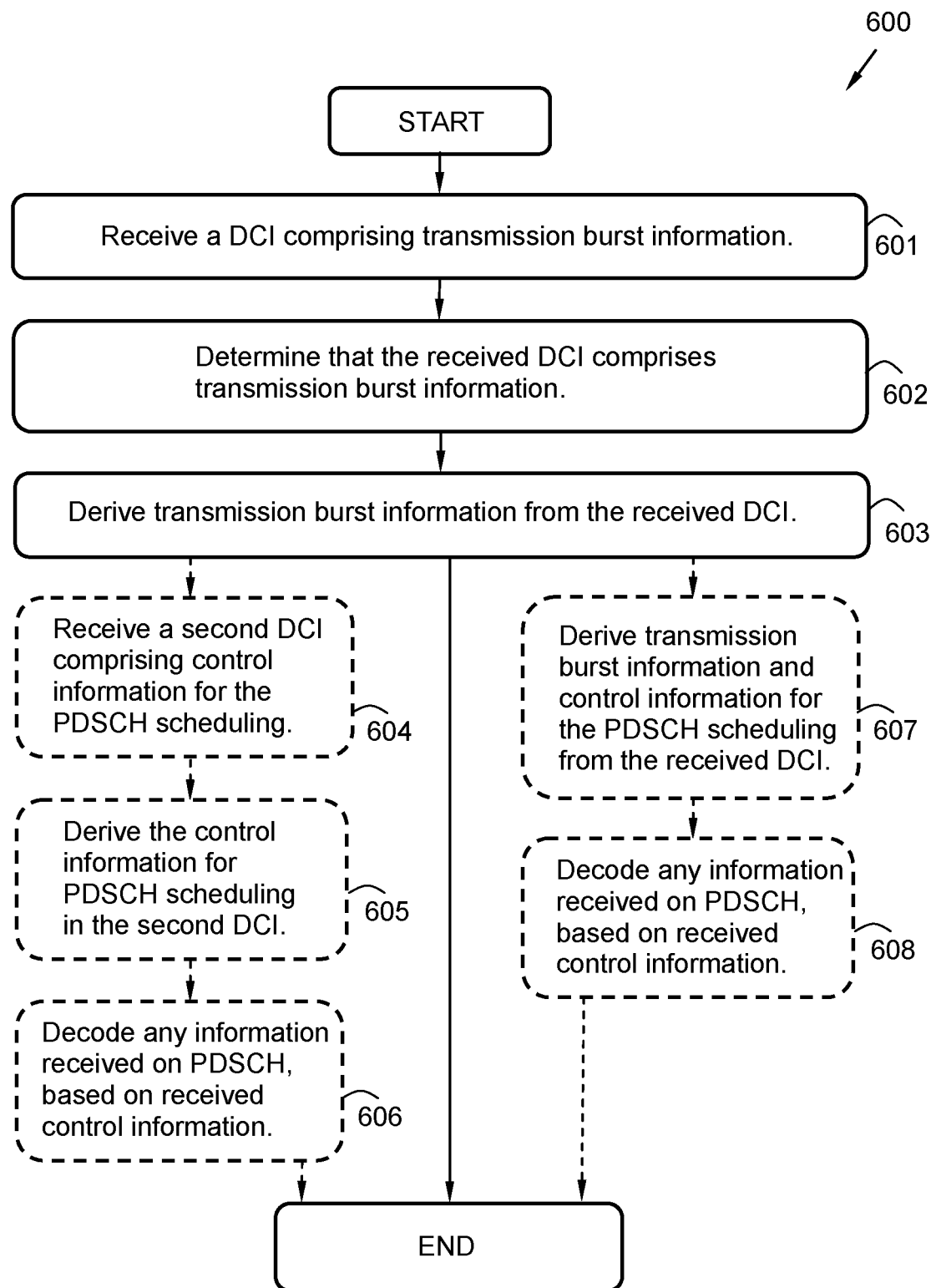
FIG. 6 is a flow chart illustrating a method in a receive device according to an embodiment of the invention.

FIG. 6 is a flow chart illustrating embodiments of a method 600 in a receive device 120, for receiving transmission burst information via downlink control signalling from a transmit device 110.

The transmit device 110 and the receive device 120 may be comprised in a wireless communication network 100. Such wireless communication network 100 may be based on LAA.

The transmission burst information may comprise any of: end subframe configuration; power of a CRS and/or CSI-RS; whether or not the current subframe is the end subframe; 1/2 or 4/6 OFDM symbol CRS, MBSFN or non-MBSFN; number of expected downlink subframes, starting from the current subframe, in the ongoing transmission burst; number of subframes after end of the downlink transmission, or the time duration, during which the receive device 120 need not detect transmission, monitor DCI and perform CSI measurements; presence of CSI-RS/CSI-IM; or presence of DRS, for EPDCCH/PDSCH rate matching, according to different embodiments.

To appropriately receive the transmission burst information from the transmit device 110, the method 600 may comprise a number of actions 601-608.

It is however to be noted that any, some or all of the described actions 601-608, may be performed in a somewhat different chronological order than the enumeration indicates, be performed simultaneously or even be performed in a completely reversed order according to different embodiments. Further, some of the described actions 604-608 may be performed only in some alternative embodiments. The method 600 may comprise the following actions:

Action 601 comprises receiving a DCI 210-1 comprising the transmission burst information; wherein the DCI 210-1 has the size (same number of bits) of a DCI format 220-1 used for PDSCH scheduling. The DCI 210-1 may be received from the transmit device 110.

In some embodiments the DCI 210-1 may comprise an indication that the DCI 210-1 comprises the transmission burst information.

Action 602 comprises determining that the received 601 DCI 210-1 comprises the transmission burst information, e.g. based on the indication.

Action 603 comprises deriving the transmission burst information from the received 601 DCI 210-1.

Action 604, which may be performed only in some embodiments, may comprise receiving a second DCI 210-2 from the transmit device 110, comprising control information for the PDSCH scheduling, when the receive device 120 is scheduled with PDSCH.

Action 605, which may be performed only in some embodiments wherein action 604 has been performed, may comprise deriving the control information for PDSCH scheduling in the second DCI 210-2.

In some alternative embodiments, wherein the received DCI 210-2 comprises both the transmission burst information and control information for PDSCH scheduling, and an indication specifying that the DCI in addition to the transmission burst information also comprises control information for the PDSCH scheduling also may be comprised, action 605 may further comprise deriving both information related to the data transmission burst and control information for the PDSCH scheduling from the received DCI 210-2.

Action 606, which may be performed only in some embodiments wherein actions 604-605 has been performed, may comprise decoding any information received on PDSCH, based on the control information received in the second DCI 210-2.

In some alternative embodiments, wherein the received DCI 210-2 comprises both the transmission burst information and control information for PDSCH scheduling, and an indication specifying that the DCI in addition to the transmission burst information also comprises control information for the PDSCH scheduling, action 606 may further comprise decoding any information received on PDSCH, based on the derived control information of the received DCI 210-2.

Action 607, which may be performed only in some embodiments, may comprise deriving both information related to the data transmission burst and control information for the PDSCH scheduling from the received DCI 210-1.

Action 608, which may be performed only in some embodiments, may comprise decoding any information received on PDSCH, based on control information of the received DCI 210-1.

Figure 7:
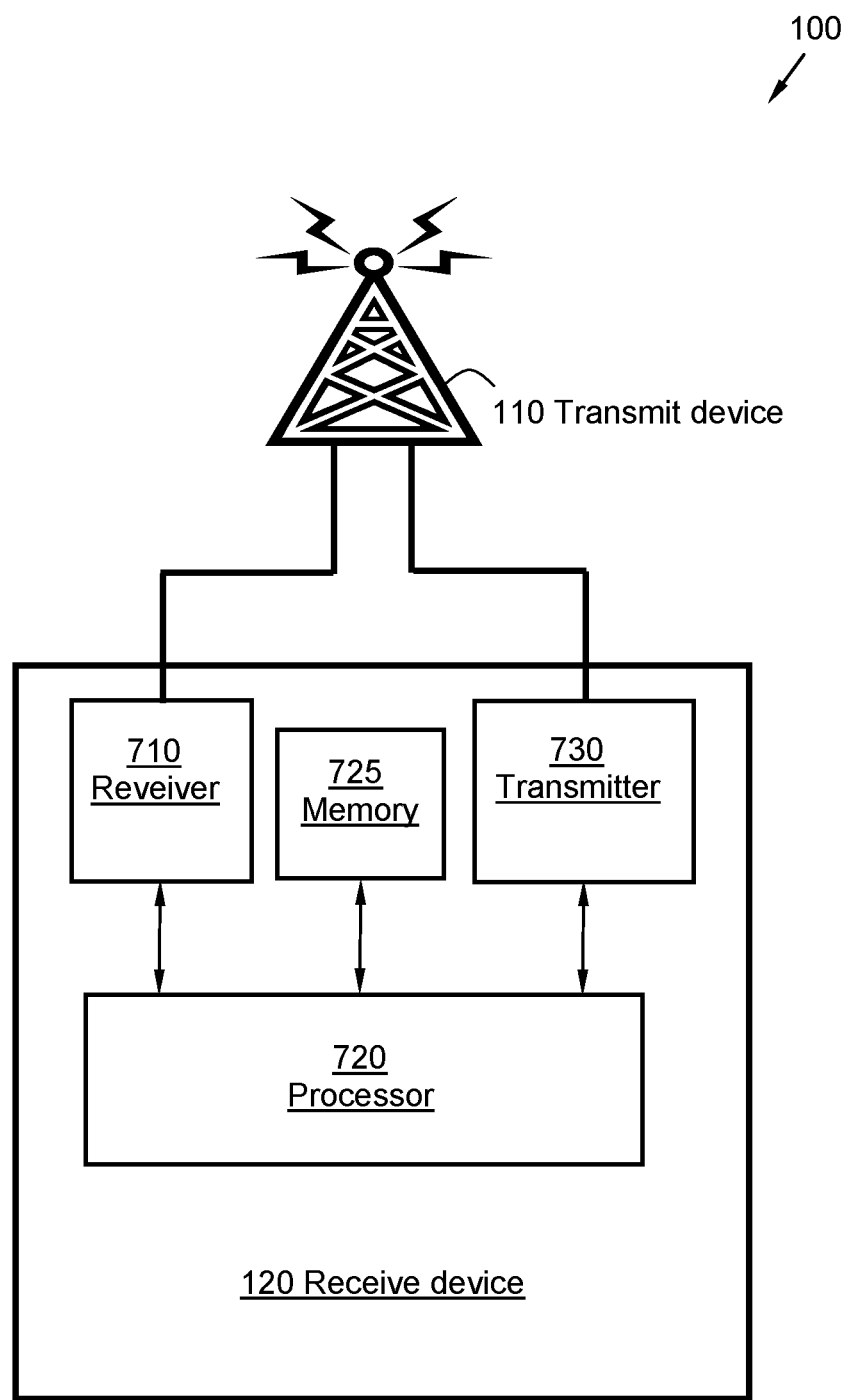
FIG. 7 is a block diagram illustrating a receive device according to an embodiment of the invention.

FIG. 7 illustrates an embodiment of a receive device 120 for receiving transmission burst information from a transmit device 110 via downlink control signalling, by performing the previously described method 600 according to at least one of the previously described actions 601-608.

The receive device 120 is configured to receive a DCI 210-1 comprising the transmission burst information; wherein the DCI 210-1 has the size (same number of bits) of a DCI format used for PDSCH scheduling and comprises an indication specifying that the DCI 210-1 comprises the transmission burst information.

The transmission burst information may comprise any of: end subframe configuration; power of a CRS and/or CSI-RS; whether or not the current subframe is the end subframe; 1/2 or 4/6 OFDM symbol CRS, MBSFN or non-MBSFN; number of expected downlink subframes, starting from the current subframe, in the ongoing transmission burst; number of subframes after end of the downlink transmission, or the time duration, during which the receive device 120 need not detect transmission, monitor DCI and perform CSI measurements; presence of CSI-RS/CSI-IM; or presence of DRS, for EPDCCH/PDSCH rate matching, according to different embodiments.

The receive device 120 is further configured to determine that the received DCI 210-1 comprises the transmission burst information, e.g. based on the indication in some embodiments.

Further, the receive device 120 is additionally configured to derive the transmission burst information from the DCI 210-1.

The receive device 120 may in some alternative embodiments be configured to receive a second DCI 210-2 comprising control information for the PDSCH scheduling, when the receive device 120 is scheduled with PDSCH.

Furthermore, the receive device 120 may be configured to derive the control information for PDSCH scheduling in the second DCI 210-2.

Also, the receive device 120 may be configured to decode any data/information received on PDSCH, based on the control information received in the second DCI 210-2, when the receive device 120 is scheduled on the PDSCH.

Furthermore, the receive device 120 may be configured to derive both information related to the data transmission burst and control information for the PDSCH scheduling from the received DCI 210-2 in embodiments wherein the received DCI 210-2 comprises both the transmission burst information and control information for PDSCH scheduling, and an indication specifying that the DCI in addition to the transmission burst information also comprises control information for the PDSCH scheduling.

Also, the receive device 120 may be configured to decode any information received on PDSCH, based on the derived control information of the received DCI 210-2 in embodiments wherein the received DCI 210-2 comprises both the transmission burst information and control information for PDSCH scheduling, and an indication specifying that the DCI in addition to the transmission burst information also comprises control information for the PDSCH scheduling.

The receive device 120 may comprise a processor 720. The processor 720 is configured to perform at least some of the above described actions 601-608, when loaded into the processor 720.

Such processor 720 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The receive device 120 also comprises a receiving circuit 710 in some embodiments, for receiving transmission burst information via downlink control signalling from a transmit device 110.

The receive device 120 also comprises a transmitting circuit 730, configured to transmit various wireless signalling.

The method 600 comprising the actions 601-608 may be implemented through the one or more processors 720 in the receive device 120 together with computer program product for performing the functions of the method 600, for obtaining the transmission burst information from the transmit device 110 via downlink control signalling, when loaded into the processor 720.

Thus a computer program comprising program code for performing the method 600 according to any embodiments of actions 601-608, may be performed when the computer program is loaded in the processor 720.

The computer program product mentioned above may be provided for instance in the form of a data carrier carrying computer program code for performing at least some of the actions 601-608 according to some embodiments when being loaded into the processor 720. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the receive device 120, e.g., over an Internet or an intranet connection.

The terminology used in the description of the embodiments as illustrated in the accompanying drawings is not intended to be limiting of the described methods 400, 600, transmit device 110 and/or receive device 120. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A non-transitory storage medium comprising instructions which, when executed by a computer, cause the computer to:
jointly encode at least two of the three following pieces of transmission burst information in first Downlink Control Information (DCI): an end subframe configuration, number of subframes to monitor, or whether a current subframe is an end subframe, thereby arriving at encoded transmission burst information; and transmit the first DCI comprising the encoded transmission burst information with a first DCI format to a receive device, the first DCI format has a same number of bits as a second DCI format of a second DCI used for Physical Downlink Shared Channel (PDSCH) scheduling; and transmitting the second DCI to the receive device, the second DCI comprising control information for PDSCH scheduling.

2. The non-transitory storage medium according to claim 1, wherein the first DCI comprises an indication that the first DCI comprises the transmission burst information.

3. The non-transitory storage medium according to claim 1, wherein when the instructions are executed by the computer, the instructions further cause the computer to:

transmit the first DCI in response to a determination that the receive device is not scheduled on the PDSCH.

4. The non-transitory storage medium according to claim 1, wherein when the instructions are executed by the computer, the instructions cause the computer to:

determine that a receive device is scheduled on the PDSCH; and transmit the second DCI comprising the second DCI format for the PDSCH scheduling.

5. The non-transitory storage medium according to claim 2, wherein the indication comprises a flag indicating that a DCI format 0 is used.

6. The non-transitory storage medium according to claim 2, wherein the indication comprises a pre-defined code point.

7. The non-transitory storage medium according to claim 1, wherein when the instructions are executed by the computer, the instructions cause the computer to:

determine the second DCI format used for the PDSCH scheduling before generating the first DCI.

8. A non-transitory storage medium comprising instructions which, when executed by a computer, cause the computer to:

receive a first Downlink Control Information (DCI), the DCI comprising encoded transmission burst information with a first DCI format, wherein the encoded transmission burst information is obtained by jointly encoding at least two of the three following pieces of transmission burst information in the first DCI: an end subframe configuration, number of subframes to monitor, or whether a current subframe is an end subframe; the first DCI format has a same number of bits as a second DCI format of a second DCI used for Physical Downlink Shared Channel (PDSCH) scheduling;

determine that the received first DCI comprises the transmission burst information; and derive the transmission burst information from the first DCI.

9. The non-transitory storage medium according to claim 8, wherein when the instructions are executed by the computer, the instructions further cause the computer to:

determine that the received first DCI comprises the transmission burst information based on an indication in the first DCI that the first DCI comprises the transmission burst information.

10. The non-transitory storage medium according to claim 8, wherein when the instructions are executed by the computer, the instructions further cause the computer to:

receive the second DCI comprising the second DCI format for the PDSCH scheduling, when a receive device is scheduled with a PDSCH;

derive control information for the PDSCH scheduling from the second DCI; and decode information received on the PDSCH, the decoding based on the control information received in the second DCI.

11. The non-transitory storage medium according to claim 8, wherein when the instructions are executed by the computer, the instructions further cause the computer to:

derive information related to the transmission burst and derive control information for the PDSCH scheduling from the received first DCI; and decode information received on a PDSCH, the decoding based on the control information of the received first DCI.

12. A communication method, comprising:

generating, by a transmit device, a first Downlink Control Information (DCI) for transmission;

jointly encode at least two of the three following pieces of transmission burst information in the first DCI: an end subframe configuration, number of subframes to monitor, or whether a current subframe is an end subframe, thereby arriving at encoded transmission burst information;

transmitting, by the transmit device, the first DCI comprising the encoded transmission burst information to a receive device, the encoded transmission burst information having a first DCI format and the first DCI format having a same number of bits as a second DCI format of a second DCI used for Physical Downlink Shared Channel (PDSCH) scheduling;

receiving, by the receive device, the first DCI from the transmit device; and transmitting, by the transmit device, the second DCI to the receive device, the second DCI comprising control information for PDSCH scheduling.

13. The communication method according to claim 12, further comprising:

deriving, by the receive device, the transmission burst information from the first DCI.

14. The communication method according to claim 12, further comprising:

receiving, by the receive device, the second DCI comprising the second DCI format for the PDSCH scheduling, when the receive device is scheduled with a PDSCH;

deriving, by the receive device, control information for the PDSCH scheduling from the second DCI; and decoding, by the receive device, information received on the PDSCH, the decoding being performed based on the control information received in the second DCI.

15. The communication method according to claim 12, further comprising:

determining, by the transmit device, that a receive device is not scheduled on a PDSCH: and transmitting, by the transmit device, the first DCI comprising the first DCI format for the transmission burst information.

16. The communication method according to claim 12, further comprising:

determining, by the transmit device, the second DCI format used for the PDSCH scheduling before generating the first DCI.

17. The communication method according to claim 12, further comprising:

determining, by the transmit device, that a receive device is scheduled on a PDSCH; and transmitting, by the transmit device, the second DCI comprising the second DCI format for the PDSCH scheduling.

18. The communication method according to claim 12, further comprising:

determining, by the transmit device, the second DCI format used for the PDSCH scheduling before generating the first DCI.

* * * * *